United States Patent [19]

Peterson et al.

[11] Patent Number: 5,392,206
[45] Date of Patent: Feb. 21, 1995

[54] CONTROL CIRCUIT FOR A SWITCHING DC-DC POWER CONVERTER INCLUDING A CONTROLLED MAGNETIC CORE FLUX RESETTING TECHNIQUE FOR OUTPUT REGULATION

[75] Inventors: Allan L. Peterson, Escondido; Hubert C. Martin, Temecula, both of Calif.

[73] Assignee: Valor Electronics, Inc., San Diego, Calif.

[21] Appl. No.: 17,022

[22] Filed: Feb. 12, 1993

[51] Int. Cl.6 .......................................... H02M 3/338
[52] U.S. Cl. ......................................... 363/19; 363/49; 363/56; 363/97
[58] Field of Search ............... 363/190, 49, 56, 90, 363/91, 97; H02M 3/338

[56] References Cited

U.S. PATENT DOCUMENTS

| | | | |
|---|---|---|---|
| 3,069,612 | 12/1962 | Hamilton | 363/19 |
| 3,072,837 | 1/1963 | Hakimoglu | 363/19 |
| 3,590,362 | 6/1971 | Kakalec | 363/22 |
| 3,739,257 | 6/1973 | Hunter | 323/248 |
| 3,988,662 | 10/1976 | Hunter | 323/248 |
| 3,989,995 | 11/1976 | Peterson | 363/19 |
| 4,272,805 | 6/1981 | Iguchi et al. | 363/19 |
| 4,441,146 | 4/1984 | Vinciarelli | 363/20 |
| 4,443,838 | 4/1984 | Yamada | 363/19 |
| 4,605,999 | 8/1986 | Bowman et al. | 363/19 |
| 4,626,976 | 12/1986 | Abe et al. | 363/19 |
| 4,700,280 | 10/1987 | Onda et al. | 363/19 |
| 4,742,290 | 5/1988 | Sutphin et al. | 320/21 |
| 4,785,387 | 11/1988 | Lee et al. | 363/21 |
| 4,888,672 | 12/1989 | Hiramatsu et al. | 363/49 |
| 4,926,303 | 5/1990 | Sturgeon | 363/19 |
| 4,958,268 | 9/1990 | Nagagata et al. | 363/16 |
| 5,012,399 | 4/1991 | Takemura et al. | 363/18 |

FOREIGN PATENT DOCUMENTS 56-17411  2/1981  Japan ......................................... 363/19

*Primary Examiner*—Jeffrey L. Sterrett
*Attorney, Agent, or Firm*—Knobbe, Martens, Olson & Bear

[57] ABSTRACT

A DC-DC power converter having a power transformer primary winding and a secondary winding producing a regulated output using a control technique and circuit to control the magnetic flux reset time of the core of the power transformer. The control circuit for the power converter provides control of the on and off time of the power transformer by controlling the magnetic flux reset voltage produced on the secondary winding, thereby controlling the duty cycle of the power transformer, and thereby regulating the output of the power transformer. Because control of the power transformer is accomplished by controlling the secondary winding reset voltage, input-to-output isolation and improved converter stability is provided. Minor variations to the input section of the DC-DC converter allows for a wide range of input voltages. Minor variations to the control circuit configuration provide the capability for short-circuit protection and inrush current limitation.

40 Claims, 11 Drawing Sheets

CONTROL CIRCUIT FOR A SWITCHING DC-DC POWER CONVERTER INCLUDING A CONTROLLED MAGNETIC CORE FLUX RESETTING TECHNIQUE FOR OUTPUT REGULATION

BACKGROUND OF THE INVENTION

1. Field of the Invention

The present invention relates, in general, to power systems and devices, and more particularly to a technique for regulating the output voltage of a DC-DC power converter. Specifically, the invention is concerned with modulating the duty cycle of a self-oscillating DC-DC power converter by controlling the magnetic flux reset time of the power transformer core. The present invention is particularly, but not exclusively applicable to low-power DC-DC power converters.

2. Description of the Related Technology

Self-oscillating regulators and power converters are old and well known in the prior art as exemplified by U.S. Pat. Nos. 5,012,399, 4,443,838, and 4,605,999. It is well known that typical self-oscillating power converters operate by storing and releasing energy in various discrete capacitive and inductive components during each cycle of operation. The operation cycles of the power converter are controlled by the switching frequency of an input power switching device. In conventional DC-DC converters, the input power switch is typically a semiconductor switch which turns on and off repetitively to provide output voltage conversion and output voltage regulation.

It is also well known to use control circuits to control the duty cycle of the input power switch which controls energization of the primary winding of a power transformer, which in turn regulates the output of the switching power converter. The control circuits utilized for controlling the duty cycle of a power transformer of the prior art are exemplified by U.S. Pat. Nos. 3,989,995 and 4,926,303. In such DC-DC converters, a direct current input is switched across the primary of an isolation transformer, and a secondary voltage is rectified and filtered to provide a direct current output.

Royer and Jensen converters are well known in the art. It is well known that many low cost, self-oscillating circuits, such as the "flyback", Royer and Jensen converters perform this function. However, because these converters deliver power to the output when the input power switch turns off, or rely on a magnetic element that saturates, simple means of control cannot be easily implemented. In fact, substantial additional components are required, including feedback networks, isolation components, and regulator circuits. The number of additional components required for output regulation in converters of the prior art often exceed the number of components required for simple unregulated power conversion. Furthermore, the operational characteristics of the prior art converters place stress on circuit components and create relatively low efficiency ratings. As is well known, cost and size is greatly influenced by the number of parts needed to construct the control circuit.

It is also well known that self-oscillating converters of the prior art operate with relatively large ripple currents or large current peaks on their input and output capacitors. In addition, in the prior art converters, the transformer primary, the input power switch, and the output section typically experience large current peaks. Large current peaks detrimentally affects the performance of the converters of the prior art.

For example, the Royer and Jensen converters use magnetic elements to deliver power to their outputs. When the magnetic elements saturate, large current peaks are produced on the input capacitors. The Royer and Jensen converters produce even greater current peaks at start-up (the initial application of input voltage) due to discontinuous inrush currents charging their output capacitors. Similarly, the flyback converters produce discontinuous currents on their outputs causing large current peaks to be produced on their output capacitors. The larger current peaks lead to lower circuit efficiency.

Control circuits which implement the output regulation of prior art self-oscillating converters are also well known in the art. The purpose of output regulation is to provide a regulated output which remains constant over varying input voltages and varying output loading conditions. Typically, especially in the case of the flyback converter, information relating to the output voltage is fed back to the self-oscillating primary circuit where it is used to control the duty cycle of the input power switch. Regulation of the Royer and Jensen outputs is accomplished by pre-regulating the voltage realized by the self-oscillating primary circuit. The Royer and Jensen circuits use feedback information from the output voltage to control the pre-regulation circuits. However, due to cost constraints, most Royer and Jensen circuits do not provide output regulation. Furthermore, in all of the converters of the prior art, the output-to-primary feedback regulation technique leads to poor input to output isolation and adversely affects converter stability.

As a result, control circuits used for controlling the duty cycle of the prior art DC-DC converters require isolating elements, for example, optical couplers, in order to couple information relating to the output of the secondary side of the transformer to the primary side. Such circuitry is costly and requires numerous circuit elements in order to perform the control operation.

Control circuits of the prior art, used for controlling the duty cycle of power converters, have also utilized control transformers for regulation. The use of a transformer to control the on-time and off-time of the input power switch, introduces added cost and decreased efficiency into the power converter system design. Furthermore, it is also well known to use magnetic elements to regulate the output voltage. Magnetic elements are used in the prior art converters to limit the volt-seconds applied to the power transformer (the product of the voltage multiplied by the time that the voltage is applied to the power transformer). After blocking the volt-seconds applied to the power transformer, the magnetic elements then saturate. By controlling the saturation delay of the magnetic elements, the converters of the prior art regulate the output voltage. However, using such magnetic elements for output regulation reduces converter efficiency and requires additional flux reset timing control.

Therefore, the need has arisen for a DC-DC power converter that has output regulation, increased reliability, increased stability, increased input to output isolation, operates over a wide range of input voltages, is physically small in size, and is implemented at low cost with few components.

SUMMARY OF THE INVENTION

It is therefore an object of the present invention to provide a DC-DC self-oscillating power converter, having novel and simplified circuitry which creates a regulated output voltage by controlling the off-time of the input power switch via control of the magnetic flux reset time of the power transformer core. It is a further object of the invention to provide a DC-DC converter circuit that operates over a wide range of input voltages, is physically small in size, and is implemented at low cost. It is a further object of the present invention to provide a control circuit for a power converter which includes a power transformer having a primary transformer winding for receiving an input voltage signal and a secondary transformer winding for generating an output signal.

The control of the off-time of the input power switch, which in turn determines the duty cycle of the power converter, is accomplished utilizing a circuit to directly control the magnetic flux reset time of the power transformer core. The interval of time necessary to reset the magnetic flux of the power transformer core is regulated by a circuit which controls the voltage amplitude on the transformer resonant reset capacitor.

The reset time of a transformer is a function of the volt-seconds, per turn, applied to the transformer core when the input switch is on. In self-oscillating converters, the next turn-on of the input power switch occurs only after the core is reset. By delaying the flux reset time directly, the present invention delays the turn-on time of the input switch, and thus indirectly modulates the duty cycle of the input switch, and thereby the duty cycle of the converter.

It is a further object of the present invention to control the input power switch of the power transformer without the necessity of complicated feedback circuitry. Without such feedback circuitry, there is no need for costly and numerous isolating circuit elements.

It is a further object of the present invention to utilize the magnetizing current stored during the on-time of the input power switch to control the duty cycle of the transformer and thus regulate the output of the DC-DC converter.

To achieve the foregoing objects, and in accordance with the invention as embodied and broadly described herein, a DC-DC converter is provided in one embodiment of the present invention which includes a control circuit for the converter which controls the magnetic flux reset time of the power transformer core. By clamping the reset voltage on the transformer core during the off-time of the input power switch, the control circuit controls the duty cycle of the converter switching device and thus maintains the desired regulated output voltage.

The present invention provides a means for controlling the voltage amplitude on the resonant reset capacitor. Because the DC output voltage varies in proportion to the duty cycle of the input switch, the output voltage may be regulated by varying the on-time/off-time ratio of the input power switch. Thus, regulation is accomplished in the present invention by using a control circuit to clamp the reset voltage at a desired level, and to thereby increase or decrease the off-time of the input power switch as desired. By varying the off-time of the input power switch in this way, the duty cycle of the power transformer is controlled, and the output voltage is therefore regulated.

By allowing the transformer core to completely reset, increased efficiency is provided and decreased electrical magnetic interference is produced. Furthermore, the present invention operates over a wide range of input voltages and output loads. By simply changing the power transformer's turn ratio, the present invention may be used with any practical direct current input voltage. Additionally, because the invention controls the magnetic flux reset time of the power transformer core via a secondary winding, and is therefore independent of the voltage applied to the primary winding, any practical DC input voltage may be accommodated.

These and other objects and features of the present invention will become more fully apparent from the following description and appended claims taken in conjunction with the accompanying drawings.

DETAILED DESCRIPTION OF THE PREFERRED EMBODIMENTS

Reference is now made to the drawings wherein like numerals refer to like parts throughout.

Figure 1:
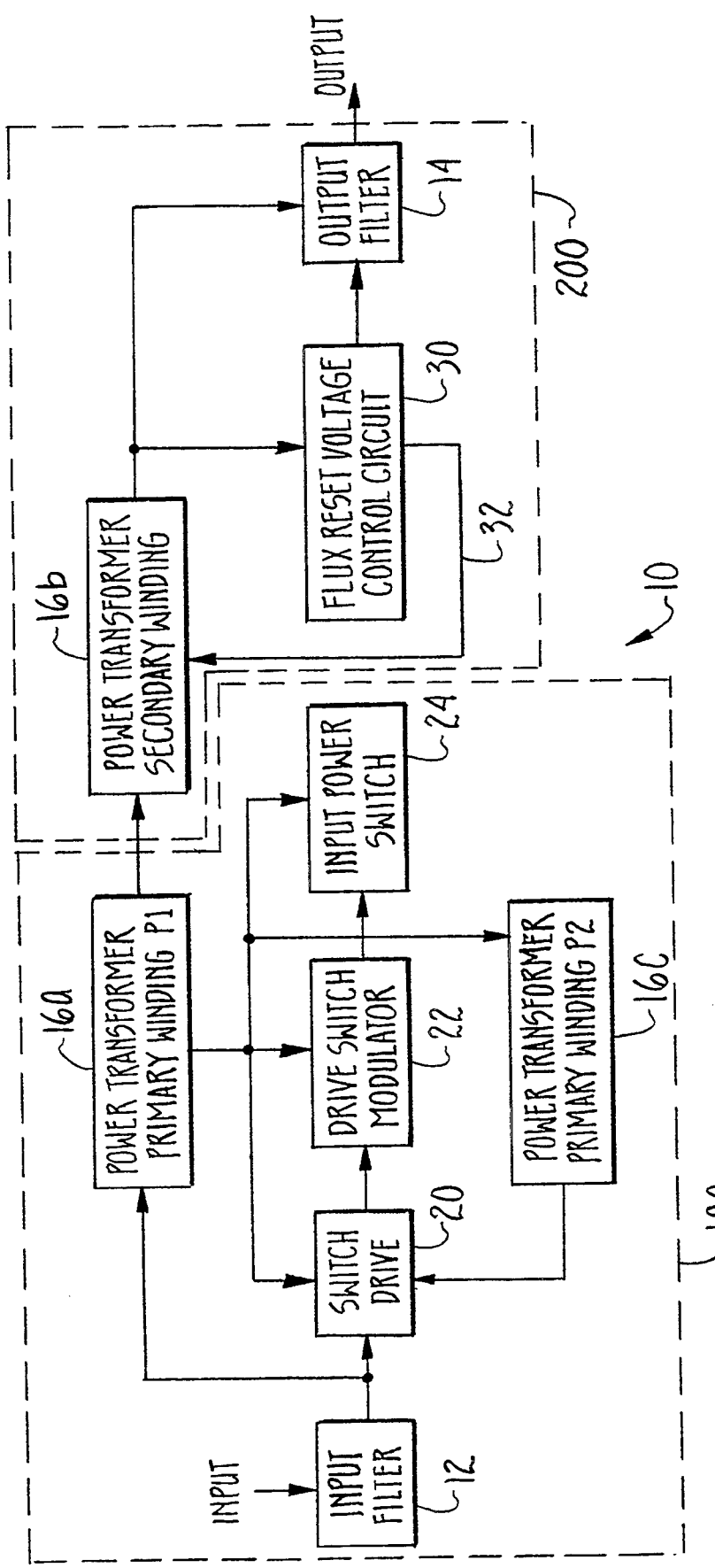
FIG. 1 is a functional block diagram of the preferred embodiment of the DC-DC power converter of the present invention.

Referring to FIG. 1, the preferred embodiment of a DC-DC power converter of the present invention is illustrated, and is referred to by general reference character 10. FIG. 1 shows the DC-DC converter 10 of the present invention having efficient and inexpensive output regulation. The power converter 10 consists of an input section 100 and an output section 200.

As shown in FIG. 1, the input section 100 comprises an input filter 12, a switch drive 20, a drive switch modulator 22, an input power switch 24 and a power transformer, generally identified by the numeral 16, having a first primary winding 16a, and a second primary winding 16c. The power converter 10 receives a direct current input voltage from a direct current source (not shown) which is applied to the input filter 12. The input filter 12 is electrically connected to the first primary winding 16a and the input power switch drive 20. The energy produced at the output of the input power switch drive 20 is modulated by the drive switch modulator 22 and applied to the input power switch 24. The input power switch 24 is energized and de-energized by the switch drive 20 as modulated by the drive switch modulator 22. Drive power for the input power switch 24 is provided by a terminal of the second primary winding 16c via the switch drive 20 and the drive switch modulator 22.

The input power switch 24 controls the switching frequency of the power transformer 16. The duty cycle of the power transformer 16 is controlled by the operation of the input power switch 24 which is electrically coupled to the first primary winding 16a. The output of the power converter 10 depends upon the duty cycle of the input switch 24. As is explained in more detail hereinafter with reference to FIGS. 2 and 3, when the input power switch 24 is on and conducting current, the transformer primary windings 16a and 16c are energized, while voltage is induced on the secondary winding 16b. Furthermore, when the input power switch 24 is conducting current, a magnetizing current is created in primary winding 16a. When the input power switch is off and not conducting current, the primary windings 16a and 16c are de-energized. However, due to the magnetizing current created in the transformer primary winding 16a, the voltages on all transformer windings "ring back" and quickly reverse polarities. Eventually, the "ring-back" effect of the primary windings 16a and 16c causes the input switch 24 to turn on again which causes the input power switch 24 switching cycle to repeat. Thus, the power converter 10 of the present invention is self-oscillating.

As shown in FIG. 1, the output section 200 comprises a power transformer secondary winding 16b, a flux reset time control circuit 30, and an output filter 14. When input power switch 24 of input section 100 is conducting current, causing current to flow through the first primary winding 16a, a voltage is induced in the secondary winding 16b. The voltage induced in the secondary winding 16b is input to the flux reset time control circuit 30 and the output filter 14. As described in more detail hereinbelow with respect to FIG. 2, the flux reset time control circuit 30 controls the magnetic core flux reset time of the power transformer 16, which, in turn, regulates the output voltage produced by the power converter 10 at the output filter 14.

Briefly, the control circuit 30 regulates the output of the power converter 10 by controlling the magnetic core flux reset time of the power transformer 16 in the following manner. During the off-time of the input switch 24 (i.e. when the input switch 24 is off and not conducting current), the control circuit 30 clamps the reset voltage produced by the power transformer secondary winding 16b to a desired level. By clamping the reset voltage produced by the secondary winding 16b, the amount of time necessary to reset the core of transformer 16 is increased. This is because the amount of voltage applied to the primary winding 16a during the on-time of the input switch 24 (measured as a product of volts-seconds per turn of copper wire around the transformer core) must equal the amount of reset voltage produced by the secondary winding 16b during the off-time of the input switch 24 (also measured as volts-seconds per turn of copper wire). Therefore, limiting the voltage produced by the secondary winding 16b, increases the time required to reset the core of the power transformer 16.

Because the DC-DC converter 10 of the present invention is of the self-oscillating type, the input power switch 24 will not turn on again until the core of the power transformer 16 is virtually reset. By delaying the core magnetic flux reset time of the power transformer 16, the control circuit 30 indirectly controls the duty cycle of the input power switch 24. As more time is required to reset the core of the power transformer 16, the off-time of the input power switch 24 is thereby increased. Furthermore, because the DC-DC converter 10 of the present invention is of the self-oscillating type, the on-time of the input power switch 24, for a given fixed input voltage, remains, to a large degree, constant. Therefore, as the control circuit 30 varies the off-time of the input switch 24, the duty cycle of the input switch 24 is correspondingly varied. Because the output of the DC-DC converter 10 depends upon the duty cycle of the input power switch 24, the output is regulated by directly controlling the core magnetic flux reset time of the power transformer 16.

Unlike previously developed control circuits, the present invention does not utilize any internal or external timing elements for controlling the duty cycle of the power converter 10. Nor does the control circuit utilize a transformer for regulation purposes. Furthermore, unlike the control circuits of the prior art, the switching frequency of power converter 10 varies with DC voltage input and output load variations. By directly controlling the core flux reset time of the power transformer 16, the present invention eliminates the need for complicated feedback circuitry used by the prior art converters to control input power switches.

The preferred embodiment of the present invention will now be described in more detail with reference to FIG. 2. The DC-DC converter 10 comprises an input section 100 and an output section 200. The operation of the input section 100 will first be described as it would operate if disconnected from the output section 200. The operation of the output section 200 will then be described. Finally, the interaction of the output section 200 with the input section 100 will be described, particularly highlighting the operation of the control circuit 30.

Figure 2:
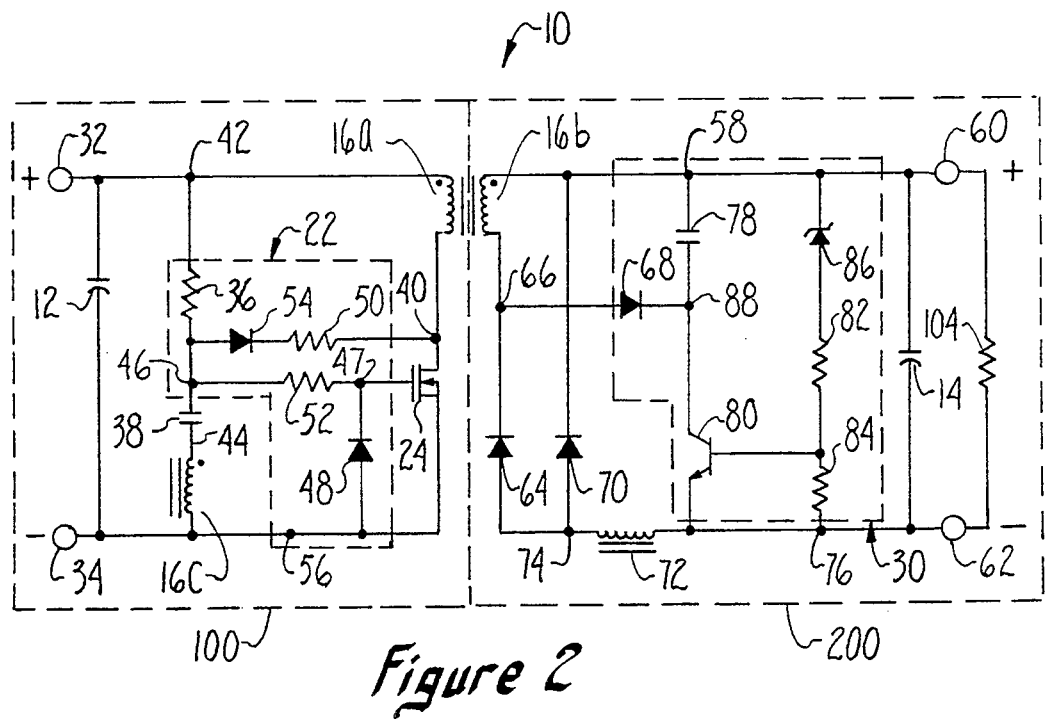
FIG. 2 is a circuit schematic of the power converter shown in FIG. 1 embodying the principles of the present invention.

Referring simultaneously to FIGS. 1 and 2, the power transformer 16 includes primary windings 16a and 16c, and a secondary winding 16b. Upon the application of a proper DC input voltage (e.g. a nominal 12 VDC) to input terminals 32 and 34, a DC signal is applied via an input filter 12 to a resistor 36, a timing capacitor 38 and the power transformer primary winding 16c. The input filter capacitor 12 preferably has a low equivalent series resistance (ESR) for limiting voltage fluctuations during the switching activity of the power converter 10.

In the preferred embodiment of the present invention, an input power switch 24 is shown in FIG. 2 as a Metal-Oxide Semiconductor Field Effect Transistor (MOSFET) which permits high frequency operation. The present invention may be implemented using any type of input switching device. For example, the input switch 24 could be implemented using a bipolar transistor. The drain of the transistor 24 is connected to the "non-dot" terminal of the primary winding 16a at a node 40. The "dot" terminal of the primary winding 16a is connected to the input terminal 32 at a node 42. Drive for the transistor 24 is provided by the dot terminal of the primary winding 16c which is connected to the timing capacitor 38 at a node 44. The drive voltage on the gate terminal of the transistor 24, produced at a node 47, is modulated by a drive switch modulator 22. The drive switch modulator 22 comprises a blocking diode 48, a timing resistor 50, a resistor 52, a diode 54 and the resistor 36.

Table 1 contains a listing of the preferred values for the components comprising the input section 100 of the preferred embodiment of the present invention. The core of the transformer 16 is the same for all of the tables and figures given hereinafter. The core of the transformer 16 is a toroidal shaped material made of manganese zinc (a ferrite material). The outer diameter of the core is approximately 0.375 inches, the inner diameter is approximately 0.187 inches. The transformer core 16 is available from Ferroxcube, Inc., Saugerties, N.Y., (a division of Philips Components) as part No. 266CT1253D3. The values entered in the table for each winding of the transformer 16 indicate the amount of turns of a copper wire around the core of the transformer 16. The gauge values for the copper wire are as given in the tables.

TABLE 1

| COMPONENT DESIGNATORS | COMPONENT TYPE | PREFERRED VALUE OR PART NUMBER |
|---|---|---|
| 12 | Capacitor | 47 μF (16 v) |
| 16a | Power Transformer First Primary Winding | 9 Turns of copper wire of No. 32 gauge (AWG) |
| 16c | Power Transformer Second Primary Winding | 3 turns of copper wire of No. 36 gauge (AWG) |
| 24 | MOSFET Transistor | ZVN4206A |
| 36 | Resistor | 22KΩ |
| 38 | Capacitor | 150 pF |
| 48 | Diode | IN4148 |
| 50 | Resistor | 3.48 kΩ |
| 52 | Resistor | 220Ω |
| 54 | Diode | IN4148 |

Having identified the interconnection of components comprising the input section 100, the operation of the input section 100 of the DC-DC converter 10 will now be described. Upon the initial application of a proper DC voltage to input terminals 32 and 34, the transistor 24 is nonconducting. However, current flows through the resistors 36 and 52, eventually raising the voltage on the node 47 to the turn-on voltage of the transistor 24 (approximately equal to 2.0 VDC in the preferred embodiment). The transistor 24 is biased conducting in response to the drive current produced by the applied DC input voltage. Additional current from the DC input source also charges the timing capacitor 38 with a positive voltage on the node 46 with respect to the node 44.

Upon reaching the turn-on voltage of the transistor 24, an additional regenerative drive voltage is provided by the energizing of the primary winding 16a. As the transistor 24 turns on and begins to conduct, the primary winding 16a is energized. The primary winding 16a transforms power from the input DC power bus at the node 42 to the primary winding 16c at a node 44. The transformed voltage appearing on the dot terminal of the primary winding 16c at the node 44 is produced at the gate terminal of the transistor 24 at the node 47 by the timing capacitor 38 and resistor 52. At this point, resistor 36 is essentially electrically disconnected from the circuit because it has an impedance value many times greater than all of the other components in the circuit.

As the transistor 24 is regeneratively turned-on, the drive voltage at node 46 is raised to a potential determined by the sum of the transformed voltage produced at the dot terminal of the primary winding 16c at node 44 and the voltage upon the previously charged timing capacitor 38. The amplitude of the voltage appearing at node 44 is determined by the turns ratio of the power transformer 16 and the level of the DC input voltage applied to the input terminals 32 and 34. As the voltage applied to the gate terminal of the transistor 24 is regeneratively increased, the transistor 24 conducts, creating magnetizing current in the first primary winding 16a. When the transistor 24 is conducting, the drain terminal of the transistor 24, at node 40, assumes the same potential as the negative DC bus node 56, minus the voltage drop across transistor 24. As the node 40 assumes the low voltage potential of the node 56, the timing capacitor 38 is discharged through the timing resistor 50 and the diode 54.

Eventually, the voltage on the timing capacitor 38 is discharged below the turn-off voltage of the transistor 24 causing the transistor 24 to begin to turn-off. The drive voltage at node 47 is regenerative due to the de-energizing of the primary winding 16c. As the transistor 24 turns off and stops conducting current, the primary winding 16c is de-energized, resulting in reduced current and reduced drive voltage at the gate terminal of the transistor 24. As the regenerative process continues, the transistor 24 turns off completely. However, due to the magnetizing current in the primary winding 16a, created when the transistor 24 was on, the voltages on all transformer windings "ring back" and quickly reverse polarities. The voltage polarity at node 40, with respect to node 42, changes from negative to positive. The transistor 24 is regeneratively driven off via resistor 52 by the transformed "ring-back" voltage on the dot terminal of the primary winding 16c in addition to the voltage on the timing capacitor 38.

At this point, the transistor 24 is regeneratively turned off, and the voltage at node 40 is positive with respect to node 42. Node 40 becoming positive, due to the primary winding 16a "ringing back," causes current to cease flowing through the diode 54 and through the timing resistor 50. Current also flows into the timing capacitor 38 from node 56 through the resistor 52 and the diode 48. As a result, the timing capacitor 38 is once again charged with energy. As the timing capacitor 38 is charged, the gate terminal of the transistor 24 at node 47 stays negative with respect to the negative bus at node 56.

The charging rate of the timing capacitor 38, during the off-time of the transistor 24, is determined by the impedance of the network comprising the resistor 52 in series with the diode 48. Because the blocking diode 48 conducts only during the off-time of the transistor 24, the charging impedance presented to the timing capacitor 38 is lower during the off-time of the transistor 24 than the discharging impedance presented to the timing capacitor 38 via the resistor 50 and the diode 54 during the on-time of the transistor 24. As a result, the timing capacitor 38 charges much more quickly during the off-time of the transistor 24 than it discharges during the on-time of the transistor 24. Therefore, the off-time of the transistor 24 is shorter than the on-time of the transistor 24. This results in a high duty cycle and allows for a lower secondary-to-primary transformer 16 turns ratio.

As the timing capacitor 38 retains its charge, while the core of the transformer 16 is resetting, the voltage at node 47 stays negative with respect to the voltage at node 56. Eventually, when the core of the transformer 16 completely resets, the voltage at node 47 will attain the turn-on voltage of the transistor 24. As the transistor 24 turns on and begins to conduct, the primary winding 16a is once again re-energized. The transistor 24 is once again regeneratively turned on as described above. The process described above continues to cycle resulting in the self-oscillating power converter of the present invention. As described hereinbelow, the duty cycle of the transistor 24 determines the duty cycle of the power transformer 16, which in turn determines the output voltage produced by the power converter 10. The duty cycle of the input switch 24 is controlled by the output section 200 of the DC-DC converter 10 of the present invention.

Having described the operation of input section 100, the interconnection of components comprising output section 200 of DC-DC converter 10 will now be described with reference to FIG. 2. The secondary winding 16b produces an alternating current at a voltage proportional to the turns ratio of the transformer 16 and the level of DC input voltage applied to the input terminals 32 and 34. The dot terminal of the secondary winding 16b is connected to a positive output bus at a node 58 which is also connected to a positive output terminal 60. The non-dot terminal of the secondary winding 16b is connected to the cathode end of a rectifying diode 64 at a node 66. The node 66 is also connected to the anode end of a rectifying diode 68. The anode end of the rectifying diode 64 is connected to the anode end of a diode 70 and to a first terminal of a filter choke 72 at a node 74. Thus, any DC voltage produced at the node 74 is filtered by the filter choke 72 and an output filter capacitor 14. The positive terminal of the output capacitor 14 is connected to node 58. The negative terminal of output capacitor 14 is connected to the negative output bus at node 76. The output filter capacitor 14 preferably has a low equivalent series resistance (ESR) for limiting voltage fluctuations during the switching activity of the power converter 10.

The cathode terminal of the diode 70 is connected to the positive output bus at node 58. The diode 70 allows a path for continuous flow of current through the filter choke 72 when the transformer 16 turns off.

The flux reset time control circuit 30 (as shown in FIG. 1) is comprised of the rectifying diode 68, a reset capacitor 78, a control transistor 80, voltage divider resistors 82 and 84 and a reference diode 86. Referring again to FIG. 2, one terminal of the reset capacitor 78 is connected to the positive output bus at node 58. The other terminal of the capacitor 78 is connected to the cathode end of the rectifying diode 68 at a node 88. Were it not for the operation of the control circuit 30, and specifically the control transistor 80, the reset capacitor 78 would not be discharged and would peak charge after a few cycles of oscillation of the power transformer 16. The reset voltage produced on all windings of the transformer 16 will approximate a half-sinusoidal, resonant waveform under these conditions.

Table 2 contains a listing of the preferred values for the components comprising the output section 200 of the preferred embodiment of the present invention. As described hereinabove with reference to Table 1, the core of the transformer 16 is available from Ferroxcube, Inc., Saugerties, N.Y., (a division of Philips Components) as part No. 266CT1253D3. The inductor 72 core is available as part No. T26-26, from Micrometals, Inc., Anaheim, Calif.

TABLE 2

| COMPONENT DESIGNATORS | COMPONENT TYPE | PREFERRED VALUE OR PART NUMBER |
|---|---|---|
| 14 | Capacitor | 47 $\mu$F (16 v) |
| 16b | Power Transformer Secondary Winding | 16 turns of copper wire of No. 33 AWG |
| 64 | Diode | IN4148 |
| 68 | Diode | IN4148 |
| 70 | Diode | IN4148 |
| 72 | Inductor | 37 turns of copper wire of No. 32 AWG |
| 78 | Capacitor | 0.01 $\mu$F |
| 80 | Bipolar Transistor | 2N2222 |
| 82 | Resistor | 3.16K$\Omega$ |
| 84 | Resistor | 634 $\Omega$ |
| 86 | Zenor Diode | IN752A (5.6 v) |

Having described the interconnection of components of the output section 200 of the power converter 10, the operation of the control circuit 30 will now be described referring to the preferred embodiment of the control circuit 30 shown in detail in FIG. 2. As is described in more detail below, the control circuit 30 operates during the off-time of the input switch 24 to control the reset voltage of the transformer 16. The control circuit 30 regulates the output of the power converter 10 by controlling the magnetic flux reset time of the power transformer 16, by clamping the reset voltage produced by the secondary winding 16b. The reset control of the present invention is now described in more detail with reference to FIG. 2.

At the moment just before the input switch 24 turns off and the transformer 16 is reset, the voltage on the dot terminal of the secondary winding 16b is more positive than the non-dot terminal at node 66. At this time, there is also a magnetizing current in the primary winding 16a. When the input switch 24 turns off, the magnetizing current in the primary winding 16a causes the voltages on all of the transformer 16 windings, including secondary winding 16b, to "ring back" and quickly reverse polarities.

Accordingly, the voltage on the non-dot terminal of the secondary winding 16b at node 66 becomes more positive than the voltage on the dot terminal at node 58. The voltage on the reset capacitor 78 at node 88 also becomes more positive than the voltage at node 58. The amplitude of the voltage on the capacitor 78 is controlled by the control transistor 80. By controlling the voltage across the reset capacitor 78, the reset voltage of the transformer 16 is thereby controlled. When the control transistor 80 conducts current, the voltage across the capacitor 78 will be discharged, and the reset voltage produced by the secondary winding 16b will be clamped to a lower level.

As node 58 becomes more positive with respect to node 76, the reference diode 86 begins to conduct current. The voltage produced on the base terminal of the control transistor 80 is thereby increased as determined by the voltage dividers 82 and 84. Eventually, the voltage produced at the base of the control transistor 80 will reach the transistor 80 turn-on voltage threshold level, and the transistor 80 will begin to conduct current. As the control transistor 80 conducts current from its collector terminal to its emitter terminal, the voltage stored across the reset capacitor 78 is discharged. With a lower voltage across the reset capacitor 78, the reset voltage across the secondary winding 16b is clamped to a lower voltage during the reset time of the transformer 16.

The reset time of the transformer 16 is a function of the product of the applied voltage multiplied by the time interval of the voltage application (measured in volt-seconds), per turn, applied to the primary winding 16a during the time interval that the input switch 24 is on and conducting current. The volt-seconds produced on the primary winding 16a during the on-time of the input switch 24 must necessarily equal the volt-seconds during reset. Therefore, by clamping the reset voltage of the transformer 16 to a lower level during the off-time of the input switch 24, the reset time of the power transformer 16 increases. Also, because the DC-DC converter 10 of the present invention is of the self-oscillating type, the input power switch 24 will not turn on again until the core of the power transformer 16 is virtually reset. Therefore, as the reset time of the power transformer 16 increases, the off-time of the input power switch 24 is thereby increased.

Thus, controlling the magnetic flux reset time of the transformer 16 indirectly controls the duty cycle of the input switch 24, which, in turn, controls the duty cycle of power converter 10. Thus, the output voltage produced at the output terminals 60 and 62 is regulated by circuitry on the secondary or the output section 200 of the power converter 10 of the present invention. By locating the control circuit on the secondary or output section, a more accurate and less costly DC-DC converter is provided. In addition, there is no need for the costly and numerous input-to-output isolating components required by the prior art converters. Furthermore, the converter of the present invention is more stable than converters of the prior art.

Figure 3:
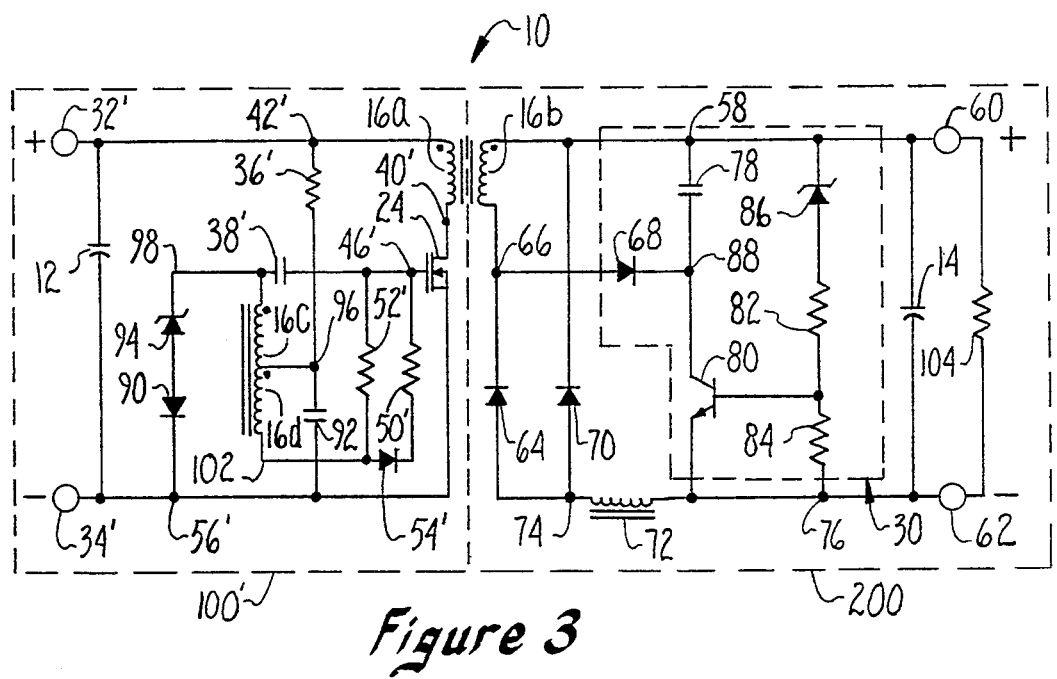
FIG. 3 is a circuit schematic of an alternative embodiment of the power converter shown in FIG. 2 having a feed-forward input configuration allowing for a wider range of acceptable DC input voltages.

Increased performance of the DC-DC converter of the present invention may be obtained by modifying the input section 100 using a feed-forward configuration. By using feed-forward, a wider range of acceptable DC input voltages may be accommodated by the DC-DC converter of the present invention. An alternative embodiment of the DC-DC converter of the present invention utilizing an input section 100' having a feed-forward configuration is shown in FIG. 3. In particular, it is noted that the output section 200 and the control circuit 30 of FIG. 2 are unchanged; operation and performance of all of the components with the same designators as in FIG. 2 are the same as described above with reference to FIG. 2. However, the input section 100' is modified to accommodate a wider range of input voltages. The operation of the input section 100' will now be described with reference to FIG. 3.

As before, the input power switch 24 is implemented with a MOSFET transistor. Drive power for the transistor 24 produced at node 46' is provided by the dot terminal of the primary winding 16c via a timing capacitor 38'. The drive voltage on the gate terminal of the transistor 24, produced on node 46', is modulated by a capacitor 92, a diode 54', a diode 90, a resistor 36', a resistor 52', a resistor 50', and a reference diode 94.

Table 3 contains a listing of the preferred values for the components comprising the input section 100' of this alternative embodiment of the present invention.

TABLE 3

| Component Designators | Component Type | Preferred Value |
| --- | --- | --- |
| 12 | Capacitor | 47 μF (16 v) |
| 16a | Power Transformer First Primary Winding | 9 turns of copper wire of No. 32 AWG |
| 16c | Power Transformer Second Primary Winding | 3 turns of copper wire of No. 36 AWG |
| 16d | Power Transformer Third Primary Winding | 3 turns of copper wire of No. 36 AWG |
| 24 | MOSFET Transistor | ZVN 4206A |
| 36' | Resistor | 2.2KΩ |
| 38' | Capacitor | 0.001 μF |
| 50' | Resistor | 3.16KΩ |
| 52' | Resistor | 1.74KΩ |
| 54' | Diode | IN4148 |
| 90 | Diode | IN4148 |
| 92 | Capacitor | 0.1 μF |
| 94 | Zener Diode | IN750A (4.7 v) |

Having identified the components that comprise the input section 100' of the alternative embodiment of the present invention using feed-forward configuration, the operation of input section 100' will now be described.

Upon the initial application of a proper DC input voltage at input terminals 32' and 34', the input transistor 24 is initially non-conducting. After the initial application of a proper DC input voltage at the input terminals 32' and 34', current flows from node 42' through the resistor 36' into the secondary winding 16d. Current also flows through the diode 54' to the resistor 50', and through the resistor 52', to node 46'. Additional current from the positive bus at node 42' charges the filter capacitor 92 with a positive voltage on node 96 with respect to a negative DC bus at node 56'. The timing capacitor 38' is also charged through the secondary winding 16c, with a positive voltage on a node 98 with respect to the gate terminal of the transistor 24 at the node 46'. The timing capacitor 38' also provides an AC current conduction path for raising the drive voltage at the gate terminal of the transistor 24 at node 46'.

Eventually, the voltage at the node 46' approaches the turn-on threshold voltage of the transistor 24. At this point, the transistor 24 begins to conduct current from its drain to its source terminal. The drive voltage at the node 46' is regenerative in nature, due to the energizing of the primary winding 16a when the transistor 24 turns on. When the transistor 24 turns on, the primary winding 16a is energized and the transformer 16 transforms power from the DC input bus at nodes 42' and 56' to the primary winding 16c. The transformed voltage appears on the dot terminal of the primary winding 16c and is conducted to the gate terminal of the transistor 24 via the timing capacitor 38'. The non-dot terminal of the primary winding 16c at node 96 is maintained at a DC voltage approximately equal to the gate turn-on threshold voltage level of the transistor 24 due to the low AC equivalent impedance of the filtering capacitor 92. At this time, the resistor 36' is essentially electrically disconnected from the circuit due to its high impedance that is many times larger than the equivalent impedance of the capacitor 92. Therefore, only a DC bias current is produced on the node 96. In order to provide the proper drive voltages at the gate terminal of the transistor 24 at the node 46', the capacitance of the capacitor 92 must be many times larger than the sum capacitance of the capacitance of the timing capacitor 38' combined with the parasitic input capacitances of the transistor 24.

As the input transistor 24 is regeneratively turned on, the drive voltage at the node 46' is raised to the level determined by the sum of the transformed voltage appearing on the dot terminal of the primary winding 16c, the DC voltage of the filtering capacitor 92, and the voltage stored on the timing capacitor 38'. As the transistor 24 is regeneratively turned on, the drain terminal of transistor 24 at a node 40' assumes the voltage produced on the negative DC input bus at node 56', minus the slight voltage drop across transistor 24. Therefore, the drain terminal of the transistor 24 at the node 40' virtually transitions from a voltage equal to the voltage at node 42' to a voltage equal to the voltage at node 56'. At the same time, the polarity at the non-dot terminal of the primary winding 16d at a node 102 becomes negative with respect to the node 96. The amplitude of the transformed voltages at the nodes 98 and 102 are determined by the turns ratio of the transformer 16 and the level of the DC input voltage applied at the input terminals 32' and 34'. As the non-dot terminal of primary winding 16d at the node 102 transitions from a positive polarity to a negative polarity, the timing capacitor 38' at the node 46' is discharged via resistor 52'.

As the timing capacitor 38' discharges, the voltage at the gate terminal of the transistor 24 at the node 46' decreases. Eventually the voltage at the node 46' will decrease to the gate turn-off threshold of the transistor 24, and the transistor 24 will begin to turn off. The turn-off of the transistor of 24 is regenerative in nature due to the fact that the transformed voltage at the dot terminal of the primary winding 16c at node 98 begins to collapse when the transistor 24 begins to turn off, resulting in still less voltage at the gate terminal of the transistor 24. The voltage at the non-dot terminal of the primary winding 16d at the node 102 also begins to collapse as the transistor 24 begins to turn off. However, the collapsing of the voltage produced by the primary winding 16d has no effect on the gate drive voltage because the impedance of the timing capacitor 38' is much lower than the impedance of the resistor 52'. As the regenerative process continues, the transistor 24 turns completely off and stops conducting current.

At this moment, there is energy stored in the core of the power transformer 16 due to the magnetizing current conducted through the primary winding 16a when the input transistor 24 was on. When the transistor 24 turns off, the magnetizing current in the primary winding 16a causes the voltage on all windings of the transformer 16 to "ring-back" and quickly reverse voltage polarities. The resulting drive voltage at the gate terminal of the transistor 24 at the node 46' is determined by the sum of the transformed "ring-back" voltage on the dot terminal of the primary winding 16c and the voltage on the timing capacitor 38'.

When the transistor 24 is turned off, the non-dot terminal of the primary winding 16a at node 40' becomes positive with respect to node 42' due to the ring-back voltage produced at the primary winding 16a. As a result, node 46' of the timing capacitor 38' starts to charge towards the now more positive node 102. The charging rate of the timing capacitor 38' is determined by the parallel network comprising the resistor 52' and the series connection of the diode 54' and the resistor 50'. Because current flows through the diode 54' and the resistor 50' only during the period when the transistor 24 is off, the capacitor 38' charges more quickly during the off-time of the transistor 24 than it discharges during the on-time of the transistor 24. Furthermore, because the off-time of the transistor 24 is determined by the charging rate of the capacitor 38', the off-time of the transistor 24 is less than the on-time. Due to an increased on-time/off-time ratio, a lower secondary-to-primary power transformer 16 turns ratio is permitted.

As the capacitor 38' continues to charge, the voltage produced at the gate terminal of the transistor 24 at the node 46' increases toward the turn-on threshold of the transistor 24. Eventually, the turn-on threshold of the transistor 24 is reached, and the transistor 24 begins to conduct. The transistor 24 is regeneratively turned on as described above, and input section 100' of the DC-DC converter of the present invention operates cyclically as described above. The process described above continues to cycle resulting in the self-oscillating power converter 10 of the present invention.

The self-oscillating operation of the present invention continues as described above for low DC input voltages. However, as the DC input voltage applied to the input terminals 32' and 34' increases, the bias resistor 36' causes the node 96 to rise in potential. The voltage produced at the node 98 also increases until it is eventually clamped by the reference diode 94 and the diode 90. Increasing the input voltage applied at the input terminals 32' and 34' also increases the transformed voltages appearing on the primary windings 16c and 16d. Because the voltage at the node 98 is clamped, the voltages produced on the nodes 96 and 102 correspondingly become more negative in polarity. Because the node 98 is clamped at a desired voltage level and the node 102 has a corresponding increase in negative polarity, the on-time of the transistor 24 decreases. As a result, the embodiment of the power converter 10 of the present invention shown in FIG. 3 has feed-forward characteristics.

With the input section 100' modified to a implement a feed-forward configuration, various DC input voltages may be applied to input terminals 32' and 34'. However, the control circuit 30 in the output section 200 need not reset the core of the power transformer 16 as much as it would were it not for the feed-forward configuration of the input section 100'. The alternative embodiment of the present invention having a feed-forward configuration for the input section 100' as shown in FIG. 3, allows for a wider range of DC input voltages to be applied to the input terminals 32' and 34'. The feed-forward configuration of the input section 100' provides a nearly constant input volt-seconds application to the first primary winding 16a. With a constant input volt-seconds application, a constant magnetizing current is produced in the first primary winding 16a. As a result, the flux reset volt-seconds remains constant over a wide range of input voltages.

As the input voltage applied to the input terminals 32' and 34' of input section 100' increases, the off-time of the transistor 24 remains constant. This is because of the constant reset volt/seconds produced by the transformer 16 due to the feed-forward configuration. Furthermore, as the loads (represented in FIG. 3 as resistor 104) across the output terminals 60' and 62' increase in resistance, the off-time of the transistor 24 increases. Conversely, as the loads across the output terminals 60' and 62' decrease in resistance, the off-time of the transistor 24 decreases. The output section 200 and the reset control circuit 30 are identical to the output section 200 and reset control circuit 30 described in reference to FIG. 2. All components have the same designator.

Figure 4A:
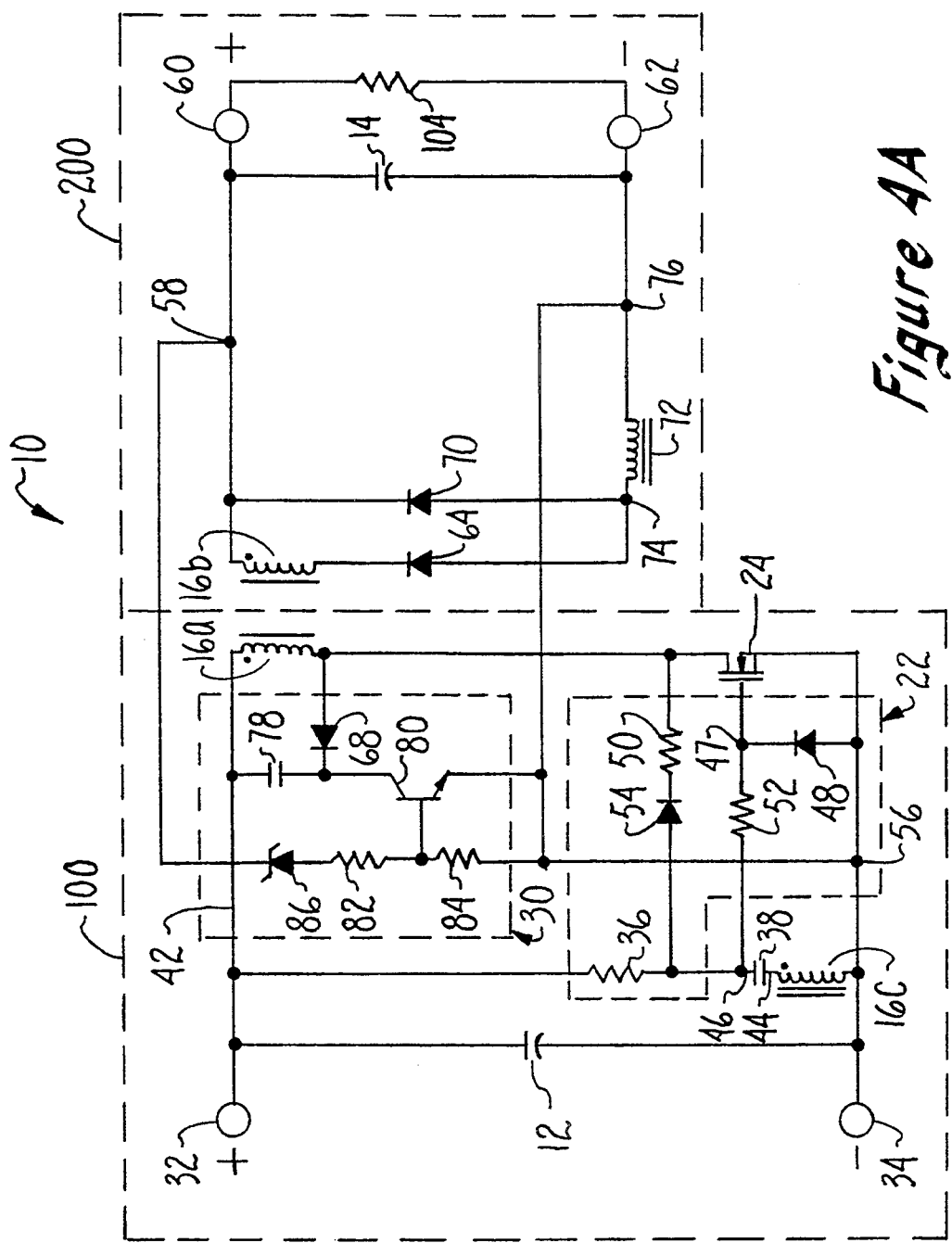
FIGS. 4a–4b are circuit schematics of alternative embodiments of the present invention having magnetic flux reset time control circuits applied to various windings of the power transformer.
Figure 4B:
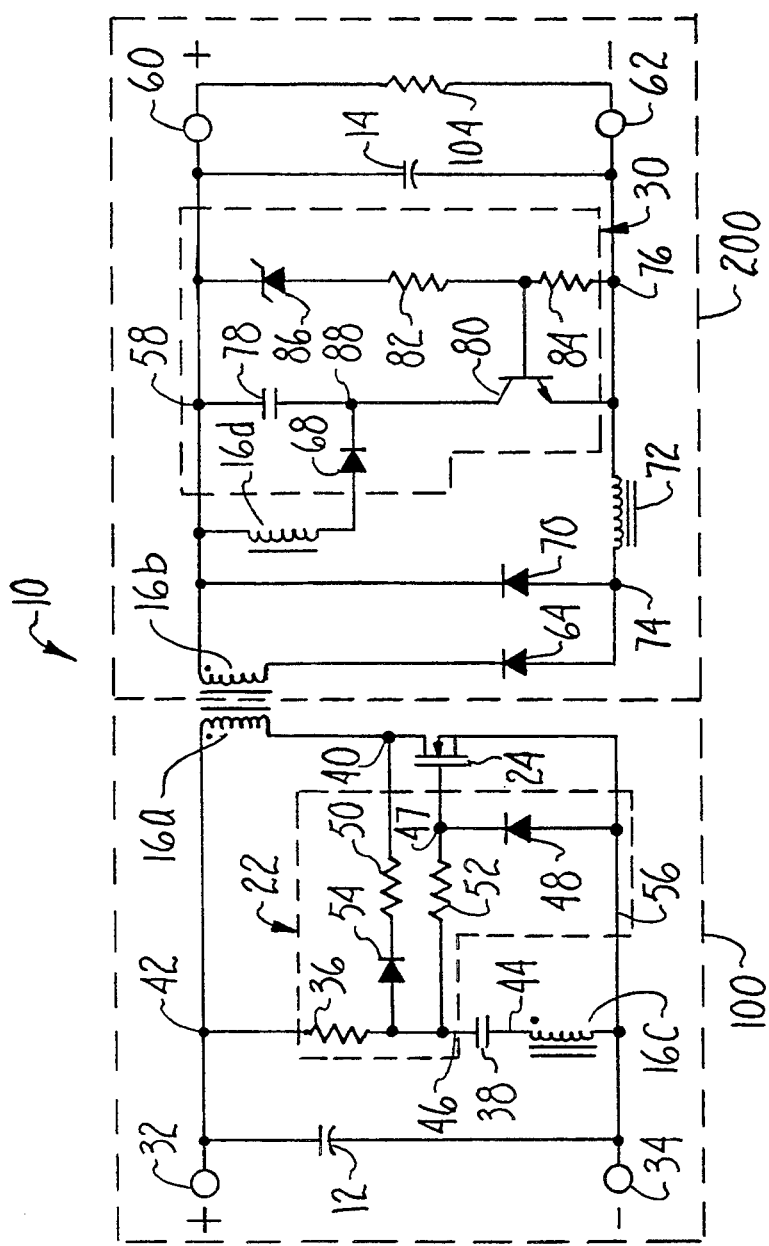

In addition to controlling the flux reset voltage of the first secondary winding 16b of the power transformer 16 as shown hereinabove in FIG. 2, alternative embodiments of the present invention use output regulation schemes to control other windings of the power transformer 16. Two alternative embodiments of the present invention are shown in FIGS. 4a and 4b. FIGS. 4a and 4b Show the control circuit 30 used to control the flux reset voltage of different windings of the power transformer 16. FIG. 4a shows the control circuit 30 controlling the reset voltage of the primary winding 16a. Similarly, FIG. 4b shows the control circuit controlling the reset voltage of a secondary winding of the transformer 16 used specifically for regulating the output voltage of the power converter 10.

Figure 5A:
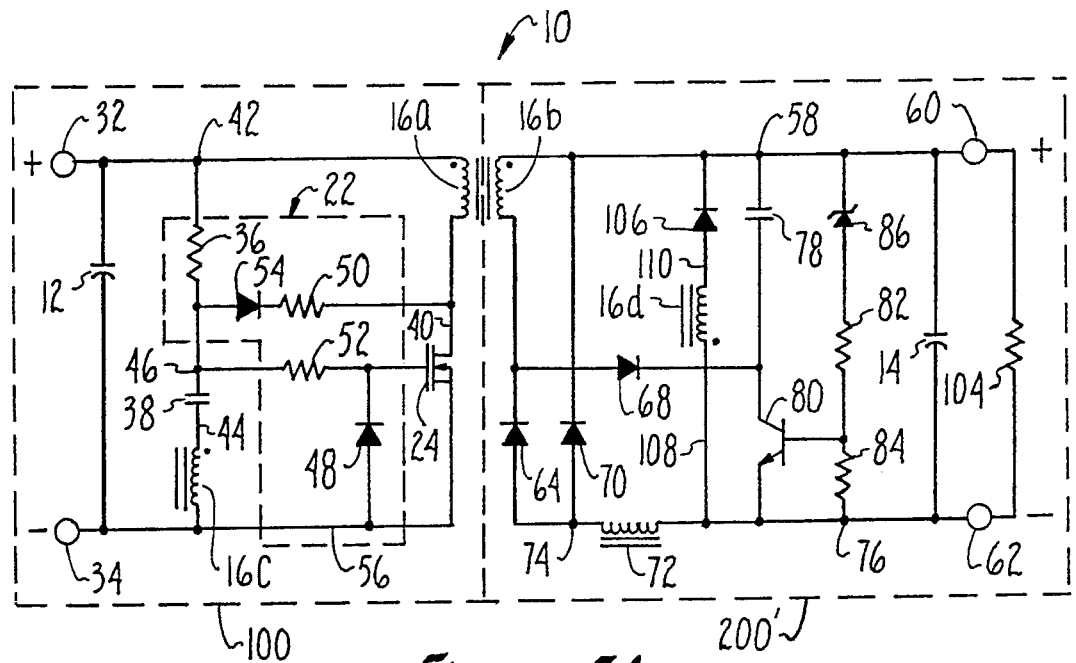
FIGS. 5a and 5b are circuit schematics of alternative embodiments of the present invention having additional short-circuit protection and inrush current limiting circuit components.
Figure 5B:
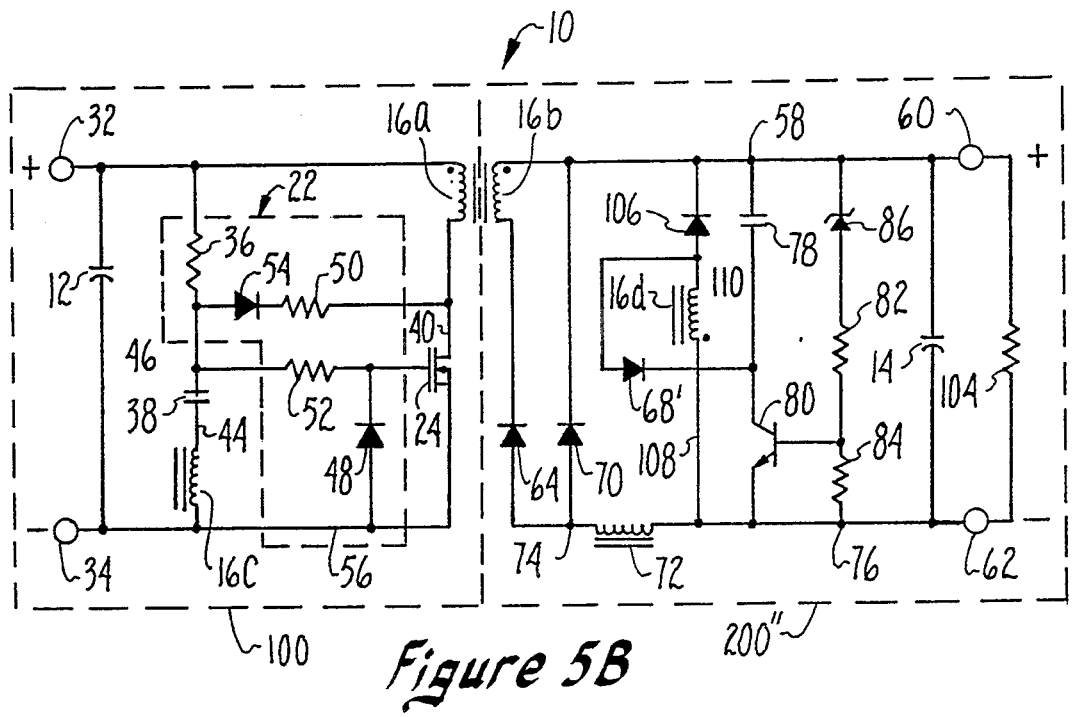

FIGS. 5a and 5b show alternative embodiments of the DC-DC converter shown in FIG. 2 having additional shortcircuit protection and inrush current limiting circuits. Referring simultaneously to.FIGS. 2, 5a, and 5b, the input sections 100 of both FIGS. 5a and 5b are identical to the input section 100 shown in FIG. 2. The output section 200' (as shown in FIG. 5a) is identical to the output section 200 shown in FIG. 2 with the exception of the addition of a short-circuit protection diode 106 (preferably using diode part number IN4148) and an additional secondary winding of transformer 16 referred to as the short-circuit protection winding 16d. The output section 200" (as shown in FIG. 5b) is identical to the output section 200' shown in FIG. 5a with the exception of the connection of diode 68'. FIG. 5b simply uses a slightly different control scheme having short-circuit and inrush current protection. The alternative embodiment shown in FIG. 5b is preferable when the output voltage is large (approximately 24 VDC or larger). The alternative embodiment shown in FIG. 5b, at higher output voltages, operates at a lower temperature than that shown in FIG. 5a, and produces less voltage operational stress on converter components.

The input sections 100 of both FIGS. 5a and 5b operate identically to the input section 100 of FIG. 2 as described hereinabove with reference to FIG. 2. The output sections 200' and 200" operate similarly to the operation of the output section 200 of FIG. 2 as described hereinabove with reference to FIG. 2. Specifically, the operation of the control circuit 30 operates as described with reference to FIG. 2 during normal operation of the circuit. As described in more detail below, the short-circuit protection devices (the diode 106 and the secondary winding 16d) have no effect on the operation of the circuit until the output terminals 60 and 62 become short-circuited; i.e. until the load represented by the resistor 104 begins to decrease the output voltage.

Referring to FIGS. 5a and 5b, the operation of an alternative embodiment of the present invention having short-circuit and inrush current protection is now described in detail. The turns ratio of the transformer 16 windings varies from winding to winding. Referring to both FIGS. 5a and 5b, the turns ratio of a first primary winding 16a is 9 turns, the turns ratio of a second primary winding 16c is 3 turns, the turns ratio of a first secondary winding 16b is 16 turns, and the turns ratio of the second secondary short-circuit protection winding 16d is 3 turns.

Under normal conditions, i.e. when the output terminals 60 and 62 are not short-circuited or overloaded, the nominal DC input voltage applied to input terminals 32 and 34 is 12 volts, and the nominal DC output voltage is 9 VDC at 225 milliamperes at full load. Under these conditions, the given turns ratio of the windings of the transformer 16 causes the diode 106 to always remain reverse biased and non-conducting. The cathode end of the diode 106 is connected to the positive DC output line at node 58. When the input power switch 24 is on and conducting current, a voltage is induced on the second secondary winding 16d. The voltage at the dot terminal of the second secondary winding 16d at a node 108 is positive with respect to the voltage at the non-dot terminal of the winding 16d at a node 110. Therefore, a negative voltage is produced on the anode end of diode 106 at node 110, which causes the diode 106 to be reverse biased when the input switch 24 is on.

Similarly, when the input switch 24 is off and non-conducting, the diode 106 will be reverse biased. When the input switch 24 turns off, the flyback voltage produced across the transformer secondary winding 16d, due to the turns ratios of the windings of the transformer 16 given above, will be approximately 6 VDC (i.e. node 110 has a positive 6 volts voltage polarity with respect to node 108). Therefore, the anode end of the diode 106 at the node 110 has approximately a 6 VDC potential, while the nominal output voltage at node 58 has a 9 VDC potential. Again, the anode of diode 106 has a lower potential (6 VDC) than the cathode of diode 106 (9 VDC), and therefore, the diode 106 is reverse biased and does not conduct.

However, the short-circuit and inrush current protection circuit of the alternate embodiment of the present invention shown in FIGS. 5a and 5b takes effect when the output of the DC-DC converter 10 at the output terminals 60 and 62 becomes overloaded. As the output of the DC-DC converter 10 of the present invention becomes overloaded at the output terminals 60 and 62, the output voltage level will begin to decrease in value. Eventually, the output voltage at the node 58 will decrease below the flyback voltage (6 VDC) produced by the winding 16d at the node 110 when the input switch 24 is off. When the output voltage at the node 58 drops below the flyback voltage of the secondary winding 16d at the node 110 (when the input switch 24 is off), the diode 106 will become forward biased and begin to conduct.

When the diode 106 conducts, the voltage across the secondary winding 16d controls the magnetic flux reset time of the core of the power transformer 16. The reset voltage on the secondary winding 16d is lower than the voltage produced on the secondary winding 16b during the off-time of the switch 24. Therefore, the reset time of the transformer 16 is controlled by the secondary winding 16d. As described hereinabove with reference to FIG. 2, lowering the reset voltage increases the reset time of the power transformer 16. Also, as described hereinabove, the input switch 24 will not turn on again until the core of the transformer 16 is virtually reset. Therefore, lowering the reset voltage increases the off-time of the switch 24.

As the off-time of the input power switch 24 increases, the duty cycle of the input power switch 24 decreases, and the input power produced upon the transformer 16 correspondingly decreases (the transformer 16 is off longer than it is on). Therefore, the input power presented to the primary winding 16a decreases as the off-time of the input power switch increases. As the output terminals 60 and 62 experience larger and larger loading, the output voltages at the node 58 become lower and lower. This, in turn, causes the flyback voltages produced on the secondary winding 16d to decrease. Decreased flyback voltages on the secondary winding 16d cause the reset time of the power transformer 16 to increase, which in turn causes the off-time of the input power switch 24 to increase. Longer transformer 16 flux reset times cause longer switch 24 off-times. As a result, the transformer 16 experiences less and less input power as the output becomes overloaded. Finally, under a complete short-circuit condition, i.e. when the output terminals 60 and 62 become electrically connected, the input power switch 24 off-time is very long with respect to the input power switch 24 on-time. Therefore, the DC-DC converter 10 of the present invention experiences less input power as the output becomes overloaded. Accordingly, the alternative embodiments of the present invention shown in FIGS. 5a and 5b provide overload protection for the DC-DC converter 10 of the present invention.

Furthermore, the alternative embodiments of the present invention shown in FIGS. 5a and 5b also provide "inrush current" limiting protection. Inrush current limiting protection limits the amount of current provided to the converter during the initial application of DC power during "start-up." The same secondary winding 16d is used to limit inrush current upon the initial application of input power at input terminals 32 and 34. The secondary winding 16d facilitates a "slow start-up" upon initial application of input power. The operation of the inrush current limiting function of the alternative embodiments of the DC-DC converter of the present invention shown in FIGS. 5a and 5b is described in detail with reference to FIGS. 5a and 5b.

Upon the initial application of DC input voltage at the input terminals 32 and 34, the output voltage at node 58 and the output terminal 60 is zero volts. The resistor 36 provides a path for the flow of DC current from the input power bus at node 42 to the timing capacitor 38. The timing capacitor 38 begins to charge with voltage. As described hereinabove with reference to FIG. 2, the voltage at the gate terminal of the input power switch 24 at node 47 begins to approach the input power switch 24 turn-on voltage threshold. Upon reaching the turn-on voltage threshold of the input power switch 24, an additional regenerative drive voltage is provided by the energizing of the primary windings 16a and 16c. As the primary winding 16c is energized, the voltage at node 44 is increased, which causes the voltage at the gate terminal of the input switch 24 at node 47 to increase. As explained in more detail hereinabove with reference to FIG. 2, the increase in voltage at node 47 causes the input power switch 24 to be regeneratively turnedon.

At this time, the timing capacitor 38 begins to discharge through the timing resistor 50 and the diode 54. The discharge of timing capacitor 38 causes the voltage at the gate terminal of the transistor 24 at node 47 to decrease. Eventually, the voltage at the gate terminal of the transistor 24 at node 47 decreases below the turn-off voltage threshold of the transistor 24, which causes the transistor 24 to turn off. As explained above with reference to FIG. 2, the turn-off of the transistor 24 is regenerative, because the primary winding 16c is de-energized as the transistor 24 stops conducting current. At the instant before the transistor 24 turns off, the output capacitor 14 is slightly charged via filter choke 72 and rectifying diode 64 to a very low voltage (nominally, approximately 0.1 VDC). This completes the first on-time portion of the input switch 24 power cycle.

As explained above with reference to FIG. 2, due to the magnetizing current stored in the primary winding 16a created when the input switch 24 was on and conducting current, the voltages on all of the windings of the transformer 16 "ring back" and quickly reverse polarities when the transistor 24 turns off. Without the addition of the second secondary winding 16d and diode 106 as shown in FIGS. 5a and 5b, the flyback voltage produced on the first secondary winding 16b would be quite high (approximately 40 VDC). However, the voltage across winding 16d is clamped to a much lower voltage level. The voltage across the secondary winding 16d is clamped to the sum of the voltage level produced at the output terminals 60 and 62 (in other words, the voltage charged upon capacitor 14) and the voltage drop across the diode 106. After the first input power cycle, the voltage clamped across secondary winding 16d is approximately 0.8 VDC (0.1 volts across the capacitor 14 plus 0.7 volts drop across diode 106).

As explained above with reference to short-circuit protection, the very low reset voltage across secondary winding 16d causes winding 16d to control the time it takes the core of the transformer 16 to reset (i.e. the magnetic flux reset time of the transformer 16). Because the reset voltage across the secondary winding 16d is clamped to such a low level, the magnetic flux reset time of the transformer 16 is very long. Furthermore, a very long reset time causes the off-time of input power switch 24 to also be very long. As a result, the increased off-time of the input power switch 24 causes the duty cycle of the input switch 24 to be very low, which, in turn, causes the average input current to be very low.

The second power cycle begins when the core of the transformer 16 virtually completely resets and the input transistor 24 turns on again. The on-time of the input power switch always remains the same. However, the off-times will become increasingly shorter with every power cycle. For example, the second power cycle's off-time is shorter than the first power cycle's off-time because the output filter capacitor 14 received additional charging, via rectifying diode 64 and filter choke 72, during the second on-time of the input transistor 24. Because the output capacitor 14 has a slightly higher voltage at the end of the second power cycle on-time than it did at the end of the first power cycle on-time, the reset voltage clamped across the secondary winding 16d is also slightly-greater.

The slightly increased reset voltage clamped across the secondary winding 16d causes the time interval necessary to reset the core of the transformer 16 to decrease slightly. The decreased magnetic flux reset time causes a slightly shorter, though still very long, transistor 24 off-time. A slightly shorter transistor 24 off-time results in a slightly greater, though still very small, average input current. On the next power cycle, the voltage clamped across the secondary winding 16d is once again slightly greater, which in turn causes a slightly greater average input current. This cycle repeats itself with each successive power cycle of the input power switch 24. The off-times of the input power switch 24 become shorter and shorter; the output voltage at output terminals 60 and 62 becomes greater and greater with every power cycle. Eventually, the output voltage will reach its nominal regulation value (typically 9 VDC).

When the output voltage at the output terminals 60 and 62 achieves the desired regulation value, the secondary winding 16d has no effect on the operation of the DC-DC power converter of the present invention. At this time, the regulation of the output of the DC-DC converter is controlled by the first secondary winding 16b as described in detail hereinabove with reference to FIG. 2. However, because the duty cycle of the input power switch 24 slowly increases after the initial application of input power at the input terminals 32 and 34, the average input current also slowly increases. Because the duty cycle increases slowly, the current drawn from the input power also increases slowly. The net result of the operation of the alternative embodiments of the present invention shown in FIGS. 5a and 5b is a DC-DC converter having a slowly rising, smooth inrush current profile or "slow start-up" when input power is initially applied.

In addition to providing short-circuit and inrush current limiting protection, the alternative embodiments shown in FIGS. 5a and 5b also reduce the voltage stress produced upon the DC-DC converter components during converter operation. The second secondary winding 16d protects many components of the DC-DC converter of the present invention from unduly high voltage conditions. More specifically, the input transistor 24, the control transistor 80, and the rectifying diode 64 are protected by the operation of the secondary winding 16d, which clamps the reset voltages on the transformer 16 during converter start-up and load transient conditions.

During load transient conditions, the output voltage at the output terminals 60 and 62 decreases, which causes the control transistor 80 to turn off. Without the presence of the second secondary winding 16d, the first secondary winding 16b would experience increased reset voltages due to the control transistor turning off. The higher reset voltages on the first secondary winding 16b are caused by the magnetizing energy in the core of the first primary winding 16a. Without the presence of the second secondary winding 16d, the reset voltages on the first secondary winding 16b can get quite large, possibly causing damage to the input transistor 24, the control transistor 80, and the rectifying diode 64. Fortunately, the second secondary winding 16d clamps the reset voltages produced by the transformer 16 to safe levels as described hereinabove. In this way, the second secondary winding 16d reduces the operational stress on the components of the DC-DC converter of the present invention. For DC-DC converters with higher output voltages, i.e., DC-DC converters producing output voltages of 24 VDC, the alternative embodiment shown in FIG. 5b further reduces the stress seen by the control transistor 80 and the rectifying diode 68'.

Thus, the present invention regulates the output of a DC-DC converter at the output section. As a result, significant cost savings, using less manufacturing materials, are made possible. A DC-DC converter having increased reliability, improved accuracy, and improved output regulation over wider input voltage ranges is therefore provided.

Figure 6:
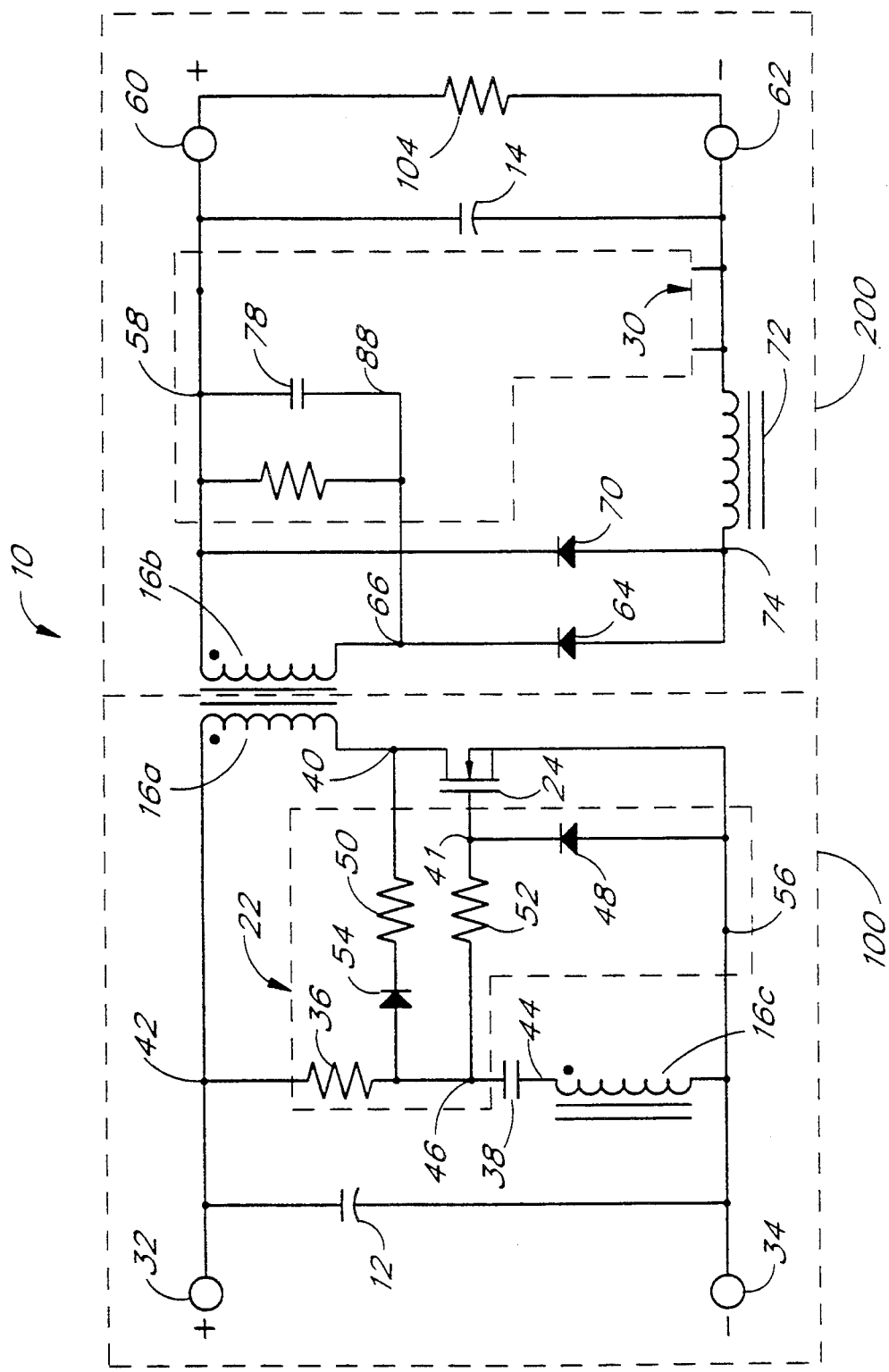
FIG. 6 is a circuit schematic of an alternative embodiment of the present invention which uses a feed-forward self-oscillating input section and a fixed reset capacitor and bleed-down resistor for reset control.

Although the present invention has been described with regard to certain versions, other versions are possible. For example, an unregulated DC-DC converter specially suited for driving relays or fixed loads may be implemented by using the feed-forward self-oscillating input section described in reference to FIG. 2 hereinabove and a fixed reset capacitor and bleed-down resistor for reset control. Such a circuit is shown in FIG. 6 which illustrates abn unregulated DC to DC converter, similar to the previously described embodiment, where the reset transistor 80 and associated circuitry has been removed resulting in a fixed reset capacitor and bleed resisotr which control the reset time of the transformer. Alternatively, the reset control circuit may be controlled by the summation of positive and negative voltages of a dual output DC-DC converter. In addition, DC-DC converters may utilize similar output regulation techniques to provide much higher output power or output voltages. Moreover, by simply adjusting the turns ratio of the power transformer 16 appropriately, DC-DC converters having the output regulation techniques of the present invention can accommodate larger input voltages.

Figure 7:
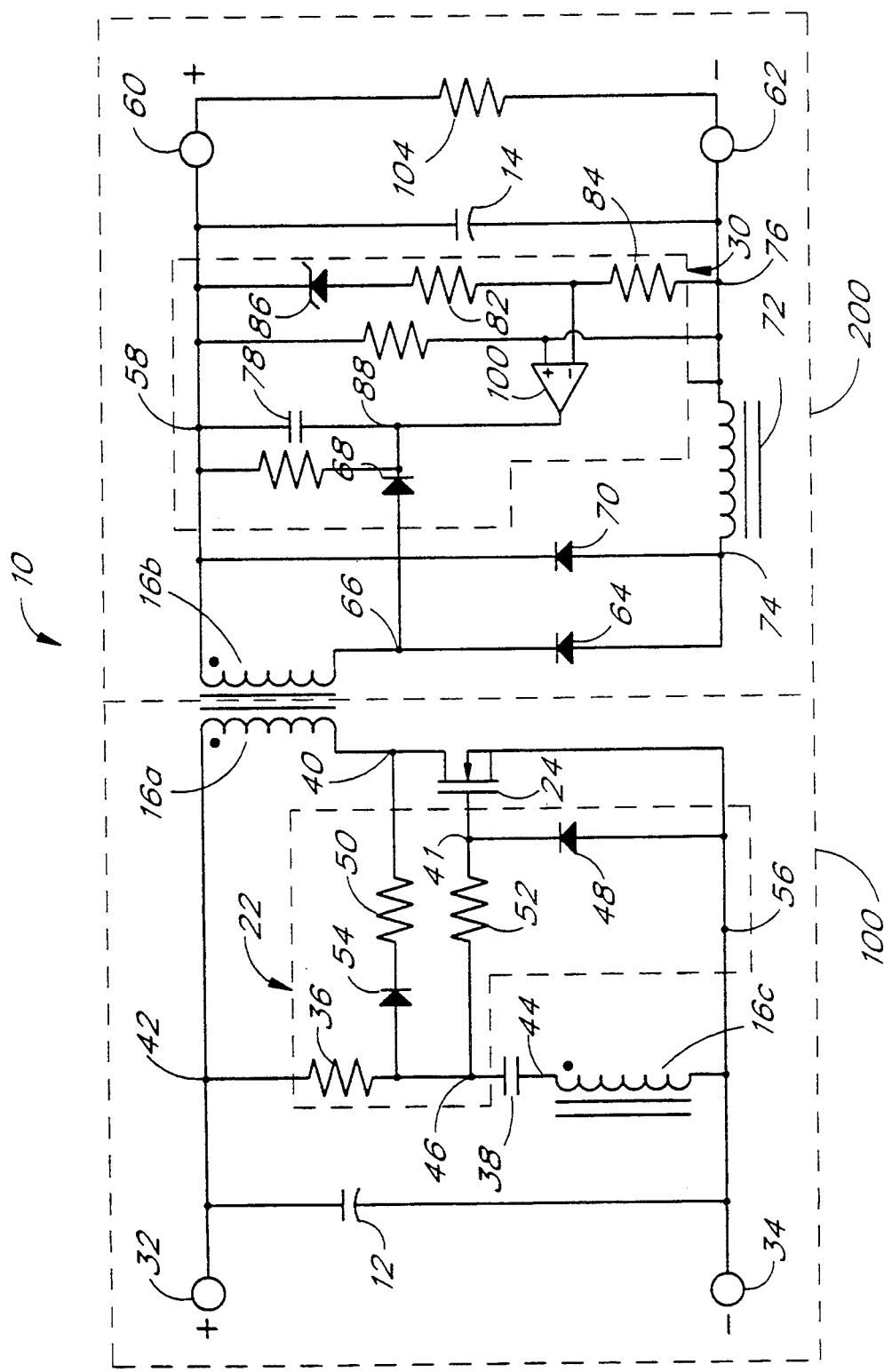
FIG. 7 is a circuit schematic of an alternative embodiment of the present invention which uses an operational amplifier as part of the magnetic flux reset time control circuit.

Further, as is understood in the art, substitutions of various components of the DC-DC converter circuits herein described can be made without departing from the present invention. For example, referring to FIG. 7, the transistor 80 in the control circuit 30 can be replaced by an operational amplifier 100 which will turn on as the reference diode 86" begins to conduct current. This results in the capacitor 78 discharging which in turn results in a lower reset voltage across the secondary winding 16b of the transformer.

Figure 8:
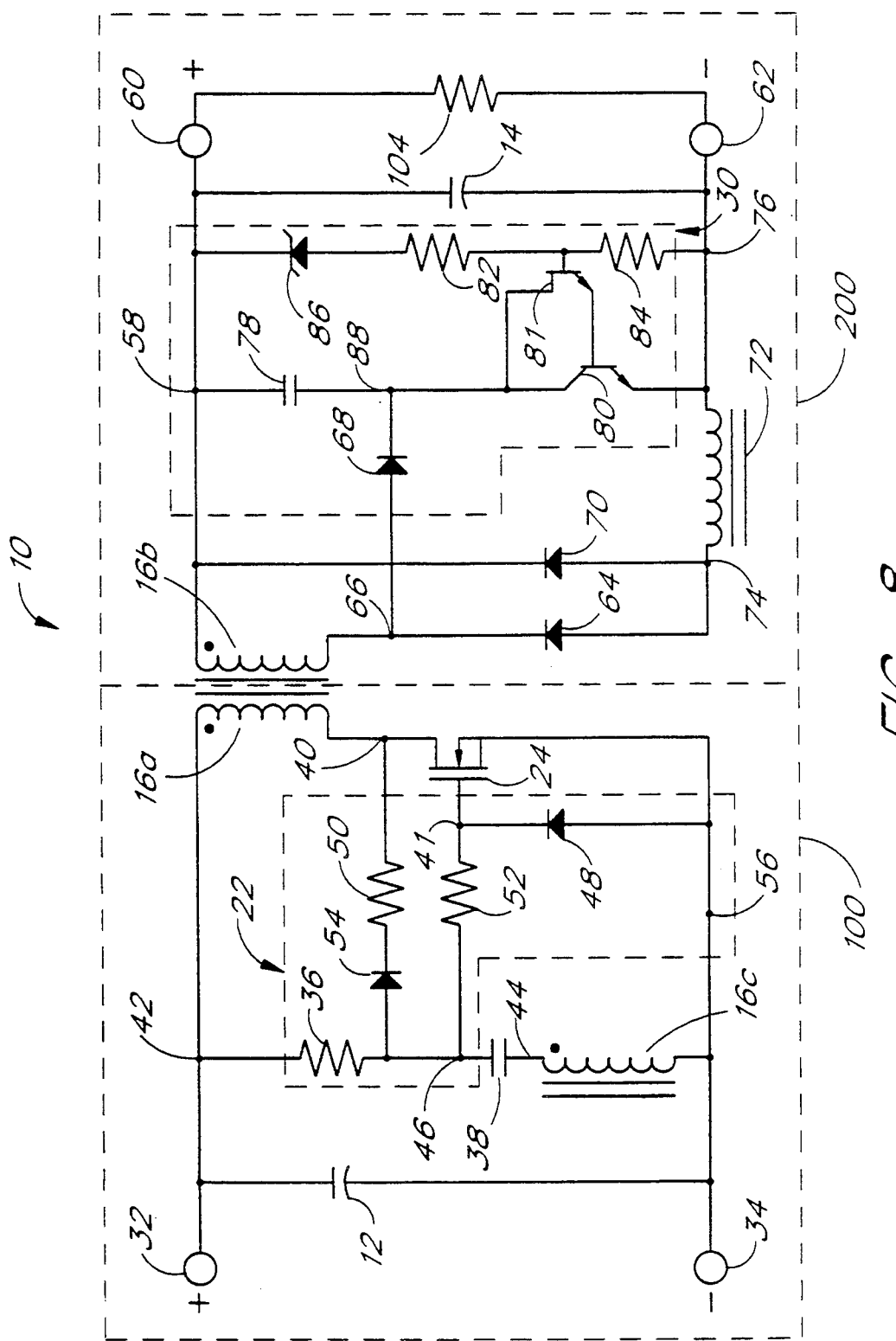
FIG. 8 is a circuit schematic of an alternative embodiment of the present invention which uses a second switching transistor for providing additional gain to the regulated output voltage.

Similarly, referring to FIG. 8, a second transistor 81 can also be coupled to the transistor 80 to provide additional gain to the regulated output voltage without departing from the scope of the present invention. Specifically, the second transistor 81 can be added so that the collectors of the transistor 80 and the second transistor 81 are common, the emitter of the second transisto 81 feeds the base of the transistor 80 and the base of the transistor 81 receives the voltage from the voltage divider network comprised of the resistors 82 and 84.

Figure 9:
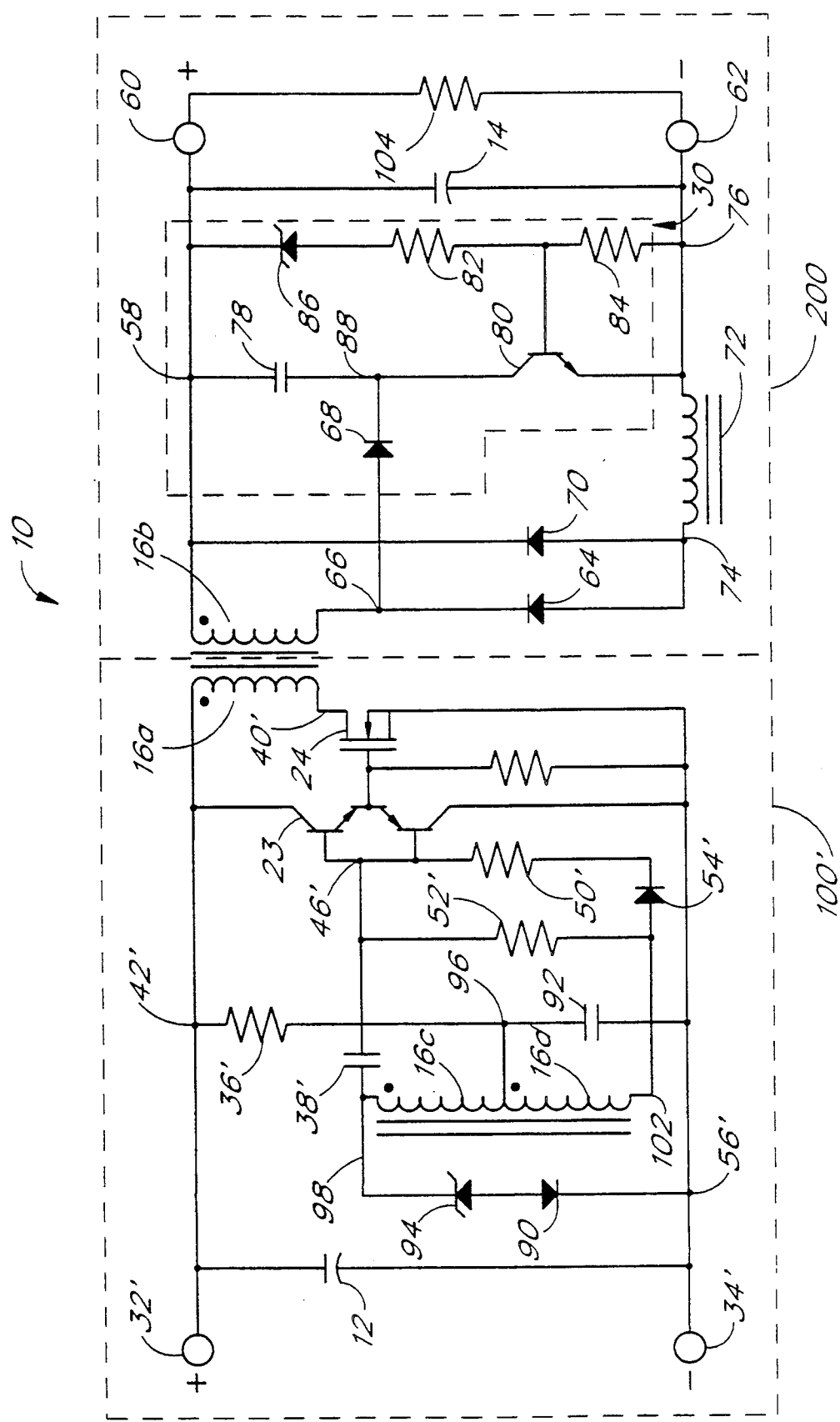
FIG. 9 is a circuit schematic of an alternative embodiment of the present invention which uses a PNP-NPN push-pull transistor amplifying stage for driving the input switching transistor.

Further, referring now to FIG. 9, performance of the input stage 100 can also be improved by using a well-known PNP-NPN push pull transistor amplifying stage 23 to drive the switching transistor 24. The amplifying stage 23 is a well known electrical component which improves the switching times of the switching transistor 24 to make the switching transistor faster and more responsive to the switch drive circuit 20 (FIG. 1).

Figure 10:
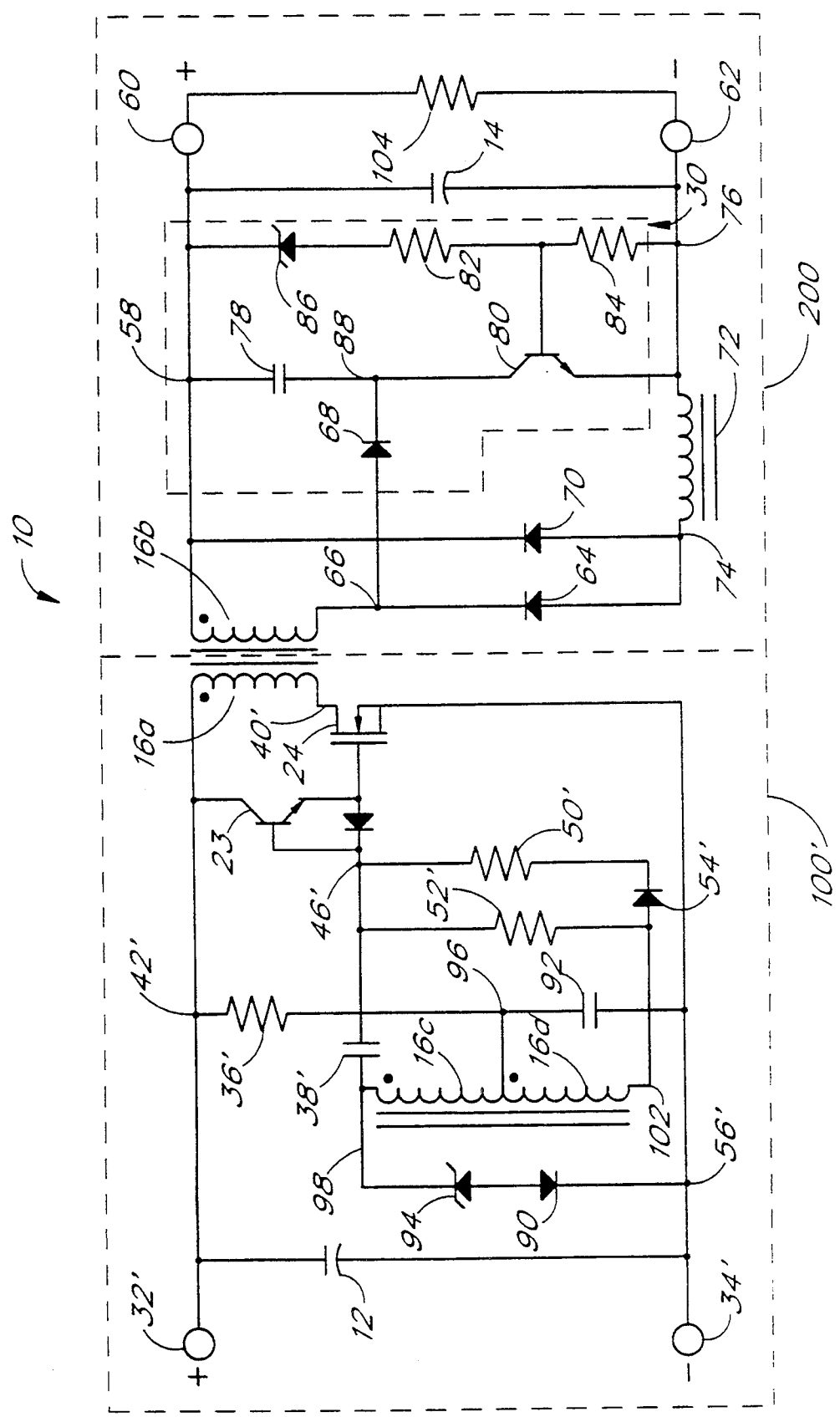
FIG. 10 is a circuit schematic of an alternative embodiment of the present invention which uses a second switching transistor to providing increased current to the switching transistor.

FIG. 10 illustrates yet another modification of the input stage 100 that is within the scope of the present invention. FIG. 10 illustrates that a bipolar transistor 110 and a biasing diode 112 have been added to the input stage 100' of the feed forward circuit shown in FIG. 3. The collector of the bipolar transisot 110 is connected to node 42', the base is connected to note 46', and the emitter is connected to the gate of the switching transistor 24. As is understood in the art, adding the bipolar transistor 110 with the biasing diode 112 to the input stage 130 increases the amount of current that can be provided to the switching transistor 24 and, consequently, the amount of current that flows through the primary winding of the transformer 16a.

Figure 11:
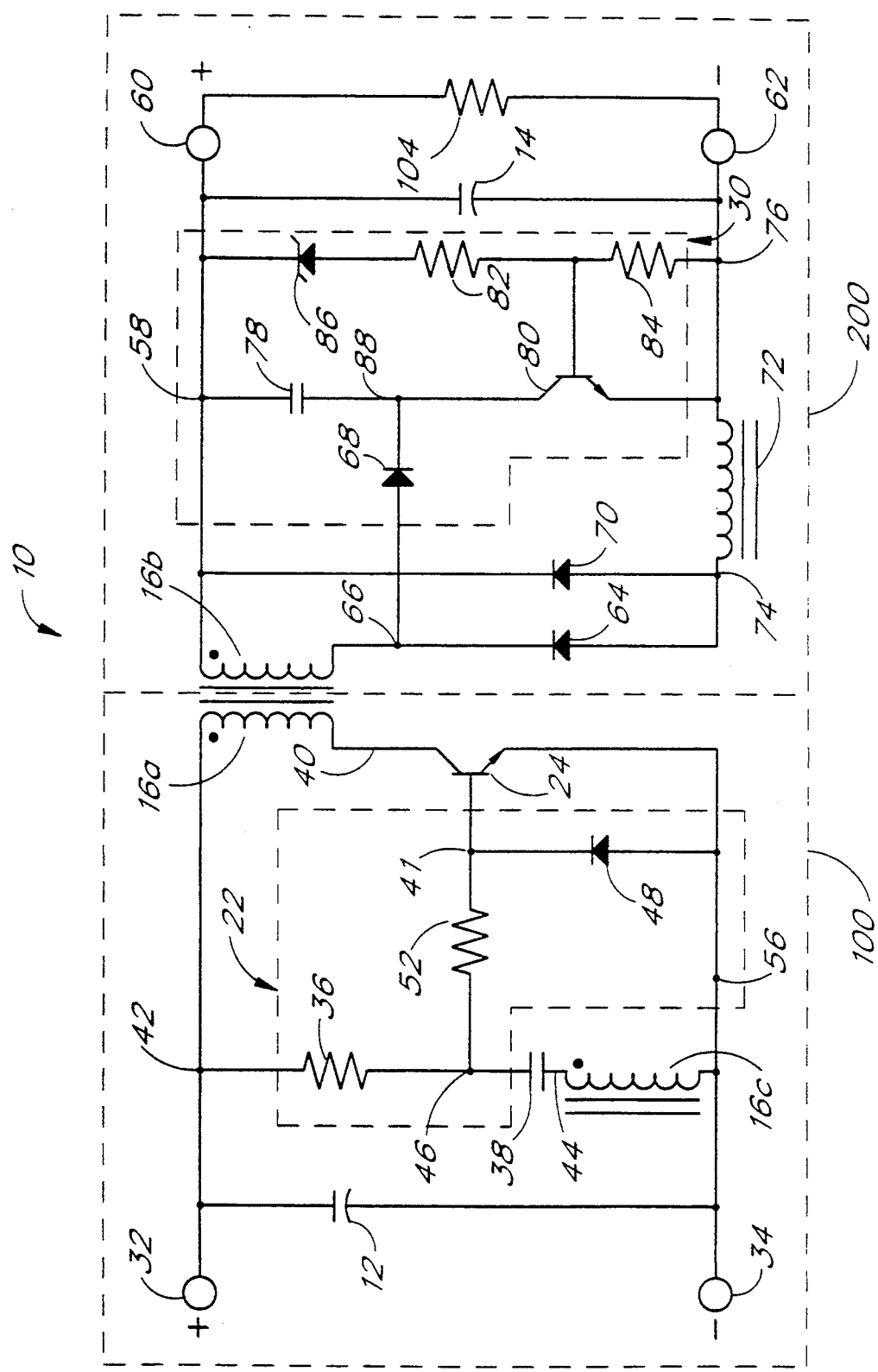
FIG. 11 is a circuit schematic of an alternative embodiment of the present invention which uses a bipolar transistor as the switching transistor in the input stage.

FIG. 11 illustrates yet another possible modification of the circuit shown in FIG. 3 wherein a bipolar transistor 24" is used as the switching transistor as opposed to the MOSFET transistor 24. As is well understood in the art, bipolar transistors can be substituted with MOSFET transistors and vice versa for specific application. Hence, the present invention is not limited to any single type of transistor or switching device, any number of possible switching devices can be used so long as they have the appropriate performance characteristics.

Hence, while the above detailed description has shown, described and pointed out the fundamental novel features of the invention as applied to various embodiments, it will be understood that various omissions and substitutions and changes in the form and details of the device illustrated may be made by those skilled in the art, without departing from the spirit of the invention.

Whereas the present invention has been described with respect to specific embodiments thereof, it will be understood that various changes and modifications will be suggested to one skilled in the art and it is intended to encompass such changes and modifications as fall within the scope of the appended claims. As a result, the scope of the present invention is not limited to the embodiments described herein, but rather the scope of the present invention is defined by the claims.

What is claimed is:

1. A self-oscillating DC-DC power converter comprising:
   input means for accepting a DC voltage source;
   a power transformer, responsive to the input means, having a first primary winding, a second primary winding, and a first secondary winding, wherein the first primary winding has a first terminal connected to the input means, and wherein the secondary winding has a first terminal connected to an output means;
   a switch drive, operatively connected to the input means, the first primary winding and the second primary winding;
   a first switch means, responsive to the switch drive, operatively connected to a second terminal of the first primary winding, for alternately and repeatedly applying the input means DC voltage to the first primary winding, the switch means controlling the on and off time of the power transformer corresponding to the on and off time of the switch means;
   a regulator, connected to a second terminal of the first secondary winding, for regulating the output voltage of the power converter, wherein the regulator controls the reset voltage produced by the first secondary winding during the off time of the switch means, the regulator controlling the magnetic flux reset time of the power transformer by controlling the off time of the switch means;
   output means, responsive to the regulator, for providing a regulated DC voltage at the output of the power converter.

2. The self-oscillating DC-DC power converter of claim 1, wherein the regulator comprises an operational amplifier operatively connected to a reference diode.

3. The self-oscillating DC-DC power converter of claim 1, wherein the regulator comprises a second switch means for providing an additional gain to the regulated output voltage.

4. The self-oscillating DC-DC power converter of claim 1, wherein the switch drive comprises a PNP-NPN push-pull transistor amplifying stage for driving the switch means.

5. The self-oscillating DC-DC power converter of claim 1, wherein the switch drive comprises a second switch means for providing increased current to the switch means.

6. The self-oscillating DC-DC power converter of claim 1, wherein the input means comprises an input filter capacitor.

7. The self-oscillating DC-DC power converter of claim 1, wherein the first switch means comprises a bipolar transistor having a base terminal, a collector terminal and a emitter terminal, and wherein the collector terminal is connected to a second terminal of the first primary winding, and wherein the emitter terminal is connected to the second terminal of the second primary winding, and wherein the base terminal is connected to the switch drive.

8. The self-oscillating DC-DC power converter of claim 1, wherein the first switch means comprises a metal-oxide semiconductor field effect transistor having a gate terminal, a source terminal and a drain terminal, and wherein the source terminal is connected to a second terminal of the second primary winding, and wherein the drain terminal is connected to the second terminal of the first primary winding, and wherein the gate terminal is connected to the switch drive.

9. The self-oscillating DC-DC power converter of claim 1, wherein the first secondary winding produces a reset voltage during the off time of the first switch means, and wherein the regulator comprises a second switch means, operatively connected to a reset capacitor, a rectifying diode, a reference diode, and two voltage divider resistors, and wherein the reset capacitor limits the reset voltage produced by the first secondary winding to a predetermined voltage level, and wherein the reset capacitor is discharged at a rate corresponding to the switching frequency of the second switch means.

10. The self-oscillating DC-DC power converter of claim 1, wherein the output means comprises an output filter capacitor.

11. The self-oscillating DC-DC power converter of claim 1, wherein the switch drive has a feed-forward configuration which controls said switch means so that a substantially constant input volt-seconds application is applied to the first primary winding of the transformer over a range of different input voltages, which thereby produces a constant magnetizing current in the first primary winding.

12. The self-oscillating DC-DC converte of claim 11, wherein the switch drive decreases the on time of the switch means in response to receiving an increased DC input voltage from said input means.

13. The self-oscillating DC-DC power converter of claim 1, wherein said regulator reduces the reset voltage of the transformer in response to said output means being overloaded so that said off time of said switch means is decreased resulting in less input power being supplied to said transformer.

14. The self-oscillating DC-DC power converter of claim 13, wherein, during start up, the regulator clamps the reset voltage of the transformer to a low reset voltage to limit the inrush current to the converter during the first power cycle of the converter and wherein the regulator then subsequently increases the reset voltage of the transformer and consequently the inrush current to the converter during subsequent power cycles of the converter.

15. The self-oscillating DC-DC power converter of claim 14, wherein the regulator comprises;
 a second secondary winding with a first terminal connected to a first output terminal of the output means;
 a diode where the anode of the diode is connected to the second terminal of the second secondary winding, and the cathode of the diode is connected to a first terminal of the first secondary winding;
 a reset capacitor connected a second output terminal of the output means;
 a voltage divider network connected between the first and second terminals of the output means; and
 a transistor having an emitter connected to the reset capacitor, a collector connected to the first output terminal and a base connected to the voltage divider network.

16. The self-oscillating DC-DC power converter of claim 1, wherein the regulator comprises a fixed reset capacitor and a fixed bleed down resistor so that the DC-DC power converter is configured for driving relays and other fixed loads.

17. A short-circuit protection circuit for a self-oscillating DC-DC power converter, comprising:
 a power transformer having a primary winding;
 a first secondary winding for generating an output voltage;
 an output means;
 an input switching means for controlling the switching frequency of the power transformer; and
 a second secondary winding responsive to the primary winding, wherein the second secondary winding controls the reset voltage produced by the first secondary winding during the off time of the input switching means whenever the output voltage decreases below a predetermined voltage level due to the overloading of the output means, the second secondary winding controlling the magnetic flux reset time of the power transformer by controlling the on and off time of the input switching means.

18. The circuit of claim 17, wherein said input switching means comprises:
 a switching transistor operably engaged with the power transformer; and
 a switch drive operatively engaged with the switching transistor so that the switch drive induces the switching transistor to move between an on and an off state wherein the switch drive induces the switching transistor to move from the off state to the on state when the power transformer has been reset.

19. The circuit of claim 18, wherein the power transformer includes a first and second primary winding and the second primary winding forms part of the switch drive so that the switch drive regeneratively turns the switching transistor on and off.

20. The circuit of claim 19, wherein the switch drive has a feed forward configuration so that a substantially constant input volt-seconds application is applied to the first primary winding of the power transformer over a range of different input voltages so that a constant magnetizing current is thereby produced in the first primary winding.

21. A control circuit for a self-oscillating DC-DC power converter, the converter including a power transformer having a first primary winding, a second primary winding, and a secondary winding for generating an output voltage, the converter having an input switching means for controlling the switching frequency of the power transformer, the secondary winding producing a reset voltage during the off time of the input switching means, the control circuit controlling the on and off time of the power transformer by limiting the secondary winding reset voltage to a predetermined level, comprising:
 a reset capacitor having a first terminal connected to a first terminal of the secondary winding, the reset capacitor limiting the reset voltage produced by the secondary winding to a predetermined level;
 a rectifying diode having a first terminal connected to a second terminal of the secondary winding and having a second terminal connected to a second terminal of the reset capacitor;
 a reference diode, having a first terminal connected to the first terminal of the secondary winding;
 two voltage divider resistors connected in series with the reference diode;
 a switch means, operatively connected to the reset capacitor, the rectifying diode, the reference diode and the voltage divider resistors, the switch means discharging the voltage stored by the reset capacitor during the off time of the input switching means.

22. A self-oscillating DC-DC power converter comprising:
 an input receiving a voltage signal;
 an output providing a DC voltage signal;
 a power transformer, responsive to the input voltage signal, having a first primary winding and a first secondary winding, wherein the first primary winding receives the input voltage signal, and the first secondary winding provides an output voltage to the output;
 a switch operably engaged with the transformer so that when the switch is in an on state, current flows through the first primary winding of the transformer;
 a switch drive which induces the switch to move between an on and an off state wherein the switch drive induces the switch to move from the off state to the on state when the power transformer has been reset; and
 a regulator, connected to the first secondary winding, which controls the reset voltage produced by the first secondary winding during the time when the switch is in an off state and thereby controls the magnetic flux reset time of the power transformer and the time the switch is in the off state.

23. The converter of claim 22, wherein the switching device is a MOSFET transistor.

24. The converter of claim 22, wherein the power transformer includes a second primary winding which forms part of the switch drive so that the switch drive regeneratively turns the switching device on and off.

25. The converter of claim 22, wherein the switch drive has a feed forward configuration so that a substantially constant input volt-seconds application is applied to the first primary winding of the power transformer over a range of different input voltages so that a constant magnetizing current is thereby produced in the first primary winding.

26. The converter of claim 25, wherein the switch drive decreases the on time of the transformer in response to the converter receiving an increased DC input voltage on the input from a voltage source.

27. The converter of claim 26, wherein the regulator reduces the reset voltage of the transformer in response to the output being overloaded so that the off time of the switch drive is decreased resulting in less input power being supplied to the transformer.

28. The self-oscillating DC-DC power converter of claim 27, wherein the regulator comprises:
   a second secondary winding with a first terminal connected to a first output terminal of the output;
   a diode where the anode of the diode is connected to a second terminal of the second secondary winding, and the cathode of the diode is connected to a first terminal of the first secondary winding;
   a reset capacitor connected to a second output terminal of the output;
   a voltage divider network connected between the first and second terminals of the output; and
   a transistor having an emitter connected to the reset capacitor, a collector connected to the first output terminal and a base connected to the voltage divider network.

29. A self-oscillating DC-DC power converter comprising:
   an input receiving a DC voltage;
   an output providing a DC voltage;
   a power transformer, responsive to the input DC voltage source, having a first primary winding and a first secondary winding, wherein the first primary winding receives the input DC voltage through a first terminal, and the first secondary winding provides an output voltage to the output through a first terminal;
   a switch operably engaged with a second terminal of the transformer so that when the switch is in an on state, current flows through the first primary winding of the transformer;
   a switch drive which induces the switch to move between an on and an off state wherein the switch drive induces the switch to move from the off state to the on state when the power transformer has been reset; and
   a control circuit, connected to the first terminal of the first primary winding, which controls the reset voltage produced by the first primary winding during the time when the switch is in an off state and thereby controls the magnetic flux reset time of the power transformer and the time the switch is in the off state.

30. The converter of claim 29, wherein the power transformer includes a second primary winding which forms part of the switch drive so that the switch drive regeneratively turns the switching device on and off.

31. The converter of claim 29, wherein the switch drive has a feed forward configuration so that a substantially constant input volt-seconds application is applied to the first primary winding of the power transformer over a range of different input voltages so that a constant magnetizing current is thereby produced in the first primary winding.

32. A self-oscillating DC-DC power converter comprising:
   an input receiving a DC voltage;
   an output providing a DC voltage;
   a power transformer, responsive to the input DC voltage source, having a first primary winding and a first secondary winding, wherein the first primary winding receives the input DC voltage through a first terminal, and the first secondary winding provides an output voltage to the output through a first terminal;
   a switch operably engaged with a second terminal of the transformer so that when the switch is in an on state, current flows through the first primary winding of the transformer;
   a switch drive which induces the switch to move between an on and an off state wherein the switch drive induces the switch to move from the off state to the on state when the power transformer has been reset; and
   a control circuit, connected to a first terminal of the second secondary winding of the power transformer, which controls the reset voltage produced by the second secondary winding during the time when the switch is in an off state and thereby controls the magnetic flux reset time of the power transformer and the time the switch is in the off state.

33. The converter of claim 32, wherein the power transformer includes a second primary winding which forms part of the switch drive so that the switch drive regeneratively turns the switching device on and off.

34. The converter of claim 32, wherein the switch drive has a feed forward configuration so that a substantially constant input volt-seconds application is applied to the first primary winding of the power transformer over a range of different input voltages so that a constant magnetizing current is thereby produced in the first primary winding.

35. A control circuit for a self-oscillating DC-DC power converter, the converter including a power transformer having a primary winding and a secondary winding, the converter having an input switching means for controlling the switching frequency of the power transformer, the secondary winding producing a reset voltage during the off time of the input switching means, the control circuit controlling the on and off time of the power transformer by limiting the secondary winding reset voltage to a predetermined level, comprising:
   a reset capacitor having a first terminal connected to a first terminal of the secondary winding, the reset capacitor limiting the reset voltage produced by the secondary winding to a predetermined level;
   a rectifying diode having a first terminal connected to a second terminal of the secondary winding and having a second terminal connected to a second terminal of the reset capacitor;
   a reference diode, having a first terminal connected to the first terminal of the secondary winding;
   two voltage divider resistors connected in series with the reference diode;
   a switch means, operatively connected to the reset capacitor, the rectifying diode, the reference diode and the voltage divider resistors, the switch means discharging the voltage stored by the reset capacitor during the off time of the input switching means.

36. A method for regulating the output of a self-oscillating DC-DC power converter, the converter including a power transformer having a primary winding and a secondary winding, the converter having an input switching means for controlling the switching frequency of the power transformer, the secondary winding producing a reset voltage during the off time of the input switching means, the regulation method controlling the on and off time of the input switching means, comprising:

limiting the reset voltage produced by the secondary winding to a predetermined clamped voltage level, thereby varying the magnetic flux reset time of the power transformer; and discharging the clamped reset voltage at a rate corresponding to the off time of the input switching means.

37. An inrush current limiting circuit for a self-oscillating DC-DC power converter, comprising:

a power transformer having a primary winding;

a first secondary winding for generating an output voltage;

an input means;

an input switching means for controlling the switching frequency of the power transformer; and a second secondary winding responsive to the primary winding, wherein the second secondary winding clamps the reset voltage produced by the first secondary winding to a predetermined voltage level during the off time of the input switching means when an input voltage is initially applied to the input means, the second secondary winding controlling the inrush current of the power transformer during the initial application of an input voltage to the input means.

38. The circuit of claim 37, wherein said input switching means comprises: a switching transistor operably engaged with the power transformer; and a switch drive operatively engaged with the switching transistor so that the switch drive induces the switching transistor to move between an on and an off state wherein the switch drive induces the switching transistor to move from the off state to the on state when the power transformer has been reset.

39. The circuit of claim 38, wherein the power transformer includes a first and second primary winding and the second primary winding forms part of the switch drive so that the switch drive regeneratively turns the switching transistor on and off.

40. The circuit of claim 39, wherein the switch drive has a feed forward configuration so that a substantially constant input volt-seconds application is applied to the first primary winding of the power transformer over a range of different input voltage so that a constant magnetizing current is thereby produced in the first primary winding.

* * * * *